United States Patent
Douglis et al.

(10) Patent No.: US 11,698,878 B1
(45) Date of Patent: Jul. 11, 2023

(54) HIGHSPEED SHARED-MEMORY OPTICAL NETWORK INTERFACES AND TOPOLOGY

(71) Applicant: Perspecta Labs Inc., Basking Ridge, NJ (US)

(72) Inventors: Frederick Douglis, Basking Ridge, NJ (US); Seth Robertson, Basking Ridge, NJ (US); Eric van den Berg, Basking Ridge, NJ (US)

(73) Assignee: Peraton Labs Inc., Basking Ridge, NJ (US)

( * ) Notice: Subject to any disclaimer, the term of this patent is extended or adjusted under 35 U.S.C. 154(b) by 123 days.

(21) Appl. No.: 17/228,491

(22) Filed: Apr. 12, 2021

Related U.S. Application Data

(60) Provisional application No. 63/008,801, filed on Apr. 12, 2020.

(51) Int. Cl.
| | | |
|---|---|---|
| *G06F 13/40* | (2006.01) | |
| *G06F 13/38* | (2006.01) | |
| *G06F 13/42* | (2006.01) | |
| *G06F 11/14* | (2006.01) | |
| *G06F 11/34* | (2006.01) | |

(52) U.S. Cl.
CPC ...... *G06F 13/4022* (2013.01); *G06F 11/1423* (2013.01); *G06F 11/349* (2013.01); *G06F 13/385* (2013.01); *G06F 13/4221* (2013.01); G06F 2213/0026 (2013.01); G06F 2213/3808 (2013.01)

(58) Field of Classification Search
CPC ............ G06F 13/4022; G06F 11/1423; G06F 11/349; G06F 13/385; G06F 13/4221; G06F 2213/0026; G06F 2213/3808
See application file for complete search history.

(56) References Cited

U.S. PATENT DOCUMENTS

| | | | | |
|---|---|---|---|---|
| 10,146,022 B1* | 12/2018 | Beard | ............... | G02B 6/4284 |
| 10,374,745 B1* | 8/2019 | Tanzi | ............... | H04J 14/0271 |
| 10,693,872 B1* | 6/2020 | Larson | ............... | G06F 21/31 |
| 2014/0314099 A1* | 10/2014 | Dress | ............... | H04L 49/15 |
| | | | | 370/422 |
| 2015/0089100 A1* | 3/2015 | Vijayrao | ............... | G06F 13/16 |
| | | | | 711/149 |
| 2015/0358087 A1* | 12/2015 | Pavlas | ............... | H04B 10/564 |
| | | | | 398/182 |

(Continued)

*Primary Examiner* — Ilwoo Park
*Assistant Examiner* — Aurangzeb Hassan
(74) *Attorney, Agent, or Firm* — Heslin Rothenberg Farley & Mesiti PC

(57) ABSTRACT

Examples herein include a computer system and methods. Some computer systems comprise two or more devices (each device comprises at least one processing circuit), where each computing device comprises or is communicatively coupled to one or more optical network interface controller (O-NIC) cards. Each O-NIC card comprises at least two bidirectional optical channels to transmit data and to receive additional data from each O-NIC card communicatively coupled to a device, over a channel. The system also includes one or more interfaces and a memory. Program instructions execute a method on one or more processors in communication with a memory, and the method includes modifying, during runtime of at least one application, a pairing over a given bidirectional optical channel of an interface of the interfaces to a given device.

19 Claims, 10 Drawing Sheets

(56) References Cited

U.S. PATENT DOCUMENTS

| | | | |
|---|---|---|---|
| 2016/0227300 A1* | 8/2016 | Lai .................... | H04Q 11/0066 |
| 2017/0147456 A1* | 5/2017 | Lee .................... | G06F 11/2033 |
| 2018/0375577 A1* | 12/2018 | Leigh .................... | H04Q 11/00 |
| 2019/0319868 A1* | 10/2019 | Svennebring ......... | H04L 41/147 |
| 2019/0324450 A1* | 10/2019 | Lurie .................... | H04L 9/3236 |
| 2019/0386665 A1* | 12/2019 | Shalita .................... | H03L 7/081 |
| 2020/0274828 A1* | 8/2020 | Alapati ................ | H04L 49/356 |
| 2021/0099976 A1* | 4/2021 | Mueck .................... | H04W 4/40 |
| 2021/0176543 A1* | 6/2021 | Bakopoulos ....... | H04Q 11/0066 |
| 2022/0092795 A1* | 3/2022 | Liu ........................ | G06N 3/084 |

* cited by examiner

HIGHSPEED SHARED-MEMORY OPTICAL NETWORK INTERFACES AND TOPOLOGY

CROSS-REFERENCE TO RELATED APPLICATION

This application claims priority to U.S. Provisional Application No. 63/008,801 filed Apr. 12, 2020, entitled, "HARDWARE CONFIGURATION" which is incorporated herein by reference in its entirety.

BACKGROUND OF INVENTION

Hardware and software resources are often shared by a variety of users. However, in existing network configurations for hardware, various resources are tethered to certain other resources. For example, a given Graphic Processing Unit (GPU) will be configured to be a resource of a given network resources and thus, to access the GPU, another node on the network will act as a gatekeeper. The gatekeeping of resources can negatively impact the speed at which various networked computing nodes can access network resources.

SUMMARY OF INVENTION

Shortcomings of the prior art can be overcome and benefits as described later in this disclosure can be achieved through the provision of a system for creating sophisticated network topologies with various memory buses with direct memory access, including but not limited to, Peripheral Component Interconnect Express (PCIe) network topologies, to optimize the communication and data transport underlay to solve end-user problems quickly. Various examples of the system are described below, and the system, including and excluding the additional examples enumerated below, in any combination (provided these combinations are not inconsistent), overcome these shortcomings. The system includes: two or more devices, where each device comprises at least one processing circuit, where each computing device comprises or is communicatively coupled to one or more optical network interface controller (O-NIC) cards, where each O-NIC card comprises at least two bidirectional optical channels, where each of the two or more devices is configured to transmit data to each device communicatively coupled to an O-NIC card and to receive additional data from each O-NIC card communicatively coupled to a device of the two or more devices, over a connection comprising at least one channel of the at least two bidirectional optical channels; one or more interfaces, where at least one interface of the one or more interfaces is communicatively coupled to the at least one processing circuit of each device; a memory; one or more processors in communication with the memory, where the one or more processors are communicatively coupled to at least one device of the two or more devices or to a device comprising the at least one interface of the one or more interfaces; program instructions executable by the one or more processors via the memory to perform a method, the method comprising: modifying, by the one of more processors, during runtime of at least one application, a pairing over a given bidirectional optical channel of an interface of the one or more interfaces to a given device of the two or more devices.

In some examples at least a portion of the one or more interfaces comprise Peripheral Component Interconnect Express (PCIe) network device resources.

In some examples, each of the two or more devices is selected from the group consisting of: graphical processing units, disk drives, radar receivers, central process units, field-programmable gate arrays (FPGAs), and computers.

In some examples, certain devices of the two or more devices comprise general purpose computing systems, and the at least two bidirectional optical channels are configured to forward certain data between the at least two bidirectional optical channels without interaction with any of the certain devices.

In some examples, each of the two or more devices is configured to simultaneously transmit the data to each device with the O-NIC card and to receive the additional data from each O-NIC card communicatively coupled to the at least one device.

In some examples, the method further comprising: oversubscribing total transfer bandwidth through on-O-NIC buffering of at least one O-NIC card of the plurality of O-NIC cards.

In some examples, the method further comprises: directing, by the one or more processors, at least one individual transfer over a channel of the at least two bidirectional optical channels, to one or more distinct destinations.

In some examples, the directing comprises allowing an activity selected from the group consisting of: broadcast, multicast, and flooding topologies.

In some examples, the at least one O-NIC card of the plurality of O-NIC cards comprises an additional device selected from the group consisting of: a CPU, an FPGA, an application-specific integrated circuit (ASIC), and very large scale integration (VLSI) circuit.

In some examples, the at least one O-NIC card is configured to perform an activity selected from the group consisting of: intelligently forward network traffic, intelligently direct network traffic, buffer network traffic, manipulate network traffic, secure network traffic, and filter network traffic.

In some examples, the two or more devices are configured to simultaneously transmit the data to each interface of the one or more interfaces and to receive the additional data from each interface of the one or more interfaces at full bandwidth.

In some examples, each channel on each card is configured to be independently directed.

Shortcomings of the prior art can be overcome and benefits as described later in this disclosure can be achieved through the provision of a computer-implemented method for creating sophisticated network topologies with various memory buses with direct memory access, including but not limited to, Peripheral Component Interconnect Express (PCIe) network topologies to optimize the communication and data transport underlay to solve end-user problems quickly. Various examples of the method are described below, and the method, including and excluding the additional examples enumerated below, in any combination (provided these combinations are not inconsistent), overcome these shortcomings. The method includes: configuring, by one or more processors, a topology of a computing network; generating, by the one or more processors, an execution plan for an application executed by one or more computing resources of the given computing network, where the execution plan comprises executing separable execution blocks of the application on one or more processing elements of the computing network, and where the generating comprises specifying the configured topology at an initial phase of the execution plan; effecting, by the one or more processors, execution of the application, based on the execution plan; executing, by the one or more processors, the application, in accordance with the execution plan; and monitoring, by the one or more processors, the executing application.

In some examples, effecting execution of the application comprises: activating the configured topology to enable threads of the application to run on different processing elements of the processing elements and transparently access memory of the different processing elements.

In some examples, monitoring the execution plan comprises an activity selected from the group consisting of: monitoring runtime execution to handle irregularities, where the irregularities comprise stalled processing pipelines, and re-configuring the topology during the runtime.

In some examples, generating the execution plan for the application comprises: analyzing, by the one or more processors, inherent parallelism in the application to identify the separable execution blocks and data flow paths between the separable execution blocks; and identifying, by the one or more processors, a most efficient placement of the separable execution blocks on the processing elements and a location a size of each memory resource to be utilized in the executing.

In some examples, effecting the execution of the application, based on the execution plan, comprises: based on the identifying, distributing, by the one or more processors, the separable execution blocks into units to be executed on the processing elements; and moving, by the one or more processors, data in the data flow paths between the separable execution blocks, between resources of the computing network, based on the execution plan.

In some examples, generating the execution plan further comprises reconfiguring the topology one or more times after the initial phase of the execution plan.

In some examples, the computing network comprises: two or more devices, where each device comprises or is communicatively coupled to one processing elements of the processing elements, where each computing device comprises or is communicatively coupled to one or more optical network interface controller (O-NIC) cards, where each O-NIC card comprises at least two bidirectional optical channels, where each of the two or more devices is configured to transmit data to each device communicatively coupled to an O-NIC card and to receive additional data from each O-NIC card communicatively coupled to a device of the two or more devices, over a connection comprising at least one channel of the at least two bidirectional optical channels; and one or more interfaces, where at least one interface of the one or more interfaces is communicatively coupled to the at least one processing element of the one or more processing elements.

In some examples, at least a portion of the one or more interfaces comprise Peripheral Component Interconnect Express (PCIe) network device resources.

Systems, methods, and computer program products relating to one or more aspects of the technique are also described and may be claimed herein. Further, services relating to one or more aspects of the technique are also described and may be claimed herein.

Additional features are realized through the techniques described herein. Other examples and aspects are described in detail herein and are considered a part of the claimed aspects. These and other objects, features and advantages of this disclosure will become apparent from the following detailed description of the various aspects of the disclosure taken in conjunction with the accompanying drawings.

It should be appreciated that all combinations of the foregoing aspects and additional concepts discussed in greater detail below (provided such concepts are not mutually inconsistent) are contemplated as being part of the inventive subject matter and to achieve the advantages disclosed herein.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

DETAILED DESCRIPTION OF THE INVENTION

Figure 1:
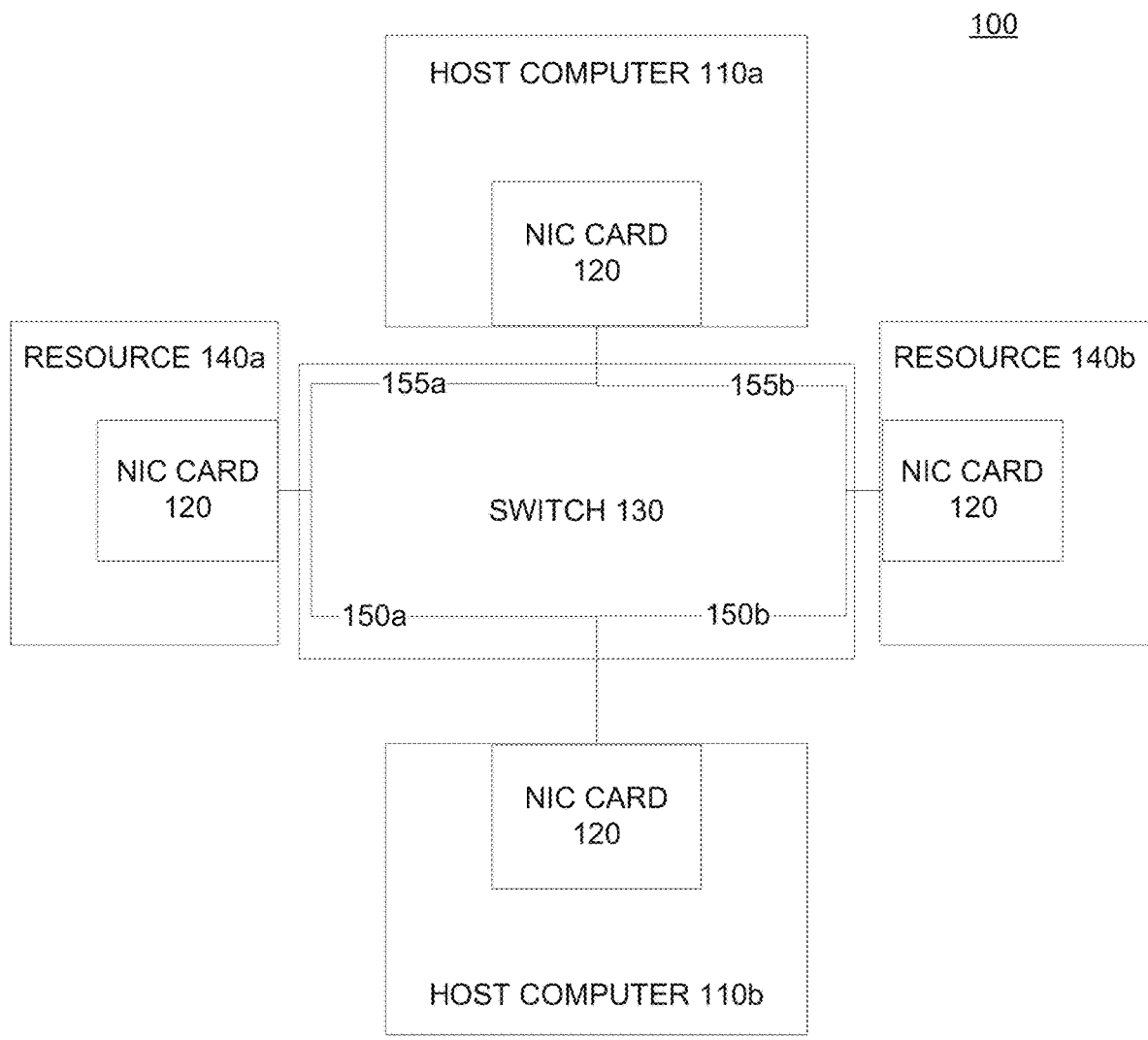
FIG. 1 depicts a technical architecture of some embodiments of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software and program code are used interchangeably throughout this application and can refer to logic executed by both hardware and software. Components of the system that can be utilized to execute aspects of embodiments of the present invention may include specialized hardware, including but not limited to, an FPGA and a GPU (graphics processor unit). Additionally, items denoted as processors may include hardware and/or software processors or other processing means, including but not limited to a software defined radio and/or custom hardware.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code includes a program/utility, having a set (at least one) of program modules, stored in a memory.

Embodiments of the present invention include a computer-implemented method, a computer system, and a computer program product, that generate, comprise, and operate various aspects of a technical architecture that can leverage continuing advances of commercial computing advances to improve network stack performance by orders of magnitude. Aspects of various embodiments of the present invention leverage existing hardware, specifically, Optical Network Interface Cards (O-NICs), which can be plugged into the Peripheral Component Interconnect Express (PCIe) slots to extend the PCIe communication channels into the optical domain at full PCIe bandwidth. As opposed to existing network topology approaches, embodiments of the present invention recognize that PCIe in the optical domain allows fine-grained direct memory transfers between servers or devices without the disadvantages of a shared bus. The dynamic network configurations disclosed herein, which include PCIe, allow for extremely efficient, low overhead, transparent zero-copy Remote Direct Memory Access (RDMA) memory transfer between cooperating tasks, which can reach aggregate speeds of about 12 Tbps in one instantiation of a server with O-NIC cards. The inclusion of PCIe networking also allows reconfigurable direct (any network participant can use the shared resources without potentially needing help from another computer, as current systems do) access to all standard PCIe device resources, such as Graphic Processing Units (GPUs), high performance Non-Volatile Memory Express (NVMe) storage drives, and data gathering sensors such as radar sensors, digital radios, and all other PCIe cards. These devices are referred to herein as additional devices, but when using the term GPU in the text below, understand that generally any additional device may be substituted in its place. Once PCIe data is in the optical domain, certain embodiments of the present invention utilize a Micro-ElectroMechanical (MEMS) optical circuit switch to connect the O-NIC cards to each other, allowing full-PCIe bandwidth network communications between two servers, a server and a PCIe device, or uniquely, between two PCIe devices. In some examples herein, a Micro-ElectroMechanical (MEMS) optical circuit switch is provided as a non-limiting examples of a specific type of switch that can be utilized in some examples disclosed herein. However, as understood by one of skill in the art, other many-to-many switches and underlying technologies can also be utilized in various embodiments of the present invention.

Embodiments of the present invention enable application developers to build a dynamic custom hardware solution from available resources (CPUs, GPUs, and FPGAs). In embodiments of the present invention, the use of PCIe to attach the optical network interface controllers (O-NICs) (as described herein, including in FIG. 1) accelerates acceptance, deployment, and transition through use of proven, widely-available attachment standards. Existing solutions may permit servers to use PCIe to access memory and devices within other servers, but that approach has significant restrictions, restrictions which do not exist in embodiments of the present invention. These restrictions include: (a) shared PCI-e resource sharing requires triple-PCIe bandwidth/lanes, triple-latency, and the "owning" server's PCIe controller resources; (b) latency is high; (c) it cannot scale to full server bandwidth (even theoretically) while still having "other" PCIe devices; and (d) there are no user-accessible computing resources on current PCIe-extending Optical NICs.

Embodiments of the present invention include a computer system, a computer-implemented method, and a computer program product, that enable direct or more direct access of computers on a network (e.g., local area network (LAN) or wide area network (WAN)) to directly access one or more additional resources on the network (e.g., graphic processing unit (GPU), attached disk drive, external memory resource, etc.), rather than via a resource in the network coupled to the one or more additional resources. A NIC card is a computer hardware component which connects a computing device to a computing network and a switch is networking hardware that connects devices on a computer network by using electrical packet or optical circuit switching to receive and forward data to destination devices. The configurations of the O-NIC cards in embodiments of the present invention extends the peripheral component interconnect express bus (PCIe) (i.e., a hardware bus used for adding internal components to a desktop computer). Hardware configurations in some embodiments of the present invention extend the PCIe bus into the optical domain with an optical NIC card (O-NIC), which will be discussed in greater detail herein, are used to connect computing resources to an optical cluster and to connect (e.g., via WAN), resources which can be, for example, hundreds of miles apart, with direct PCIe connectivity, meaning the resources in the network can engages in activities including, but not limited to, memory copies, access to common pools of resources, etc. In contrast, in existing network configurations, a computing resource, including but not limited to a GPU and/or an attached disk drive, is not a common resource for all users in the manner that aspects of embodiments of the present invention enable. Instead, each additional resource (e.g., GPU, attached disk drive, printer, etc.), is attached (coupled, etc.) to a specific computing node or computer within an infrastructure of the network. Thus, in order for a computer, other than the attached computer, to utilize the additional resource, this non-attached computer must request use of the additional resource, resulting in multiple communications between computing nodes, over the PCI bus (e.g., three times), between the requestor and the coupled node, for the requestor to utilize the resource. In some embodiments of the present invention, computing nodes are configured such that every host in the optical cluster can use any one of the additional resources (GPUs, disk drives, etc.) with an increased (e.g., full) bandwidth connection to any, all, or each resource (potentially at different times). Thus, in some embodiments of the present invention, a network is configured to include centralized resources with pipelines between each resource and each node, creating point-to-point communications at full PCIe bandwidth available on each resource, which can be approximately 12 TB in each direction in one implementation using 384 PCIe generation 5 lanes with 24 PCIe O-NIC cards (the O-NIC cards are bidirectional). As will be described in greater detail herein, in one embodiment, each O-NIC card has at least two optical channels in addition to the PCIe bus connection to the host or device. Each optical channel can send or receive full PCIe bandwidth available to that card (typically 16 "lanes" but in at least one embodiment of the present invention each lane runs at over 30 Gbps). These specific values are provided as an example, only, and do not suggest any limitations. In one embodiment, the optical channels are connected to a MEMS optical switch so that any optical channel may be circuit-switched to any, or many, other optical channels) and this association may change over time. If not all optical channels are connected to the same interconnect device, standard circuit routing and optimization techniques may be used connect any resource to any other, through the use of interconnects between smaller optical switching devices.

As will be discussed herein, aspects of some embodiments of the present invention achieve significant advances in dynamic network flexibility and greatly add to the expressive networking power. To that end, depending upon the resources in a cluster, in embodiments of the present invention, configurations can vary while still maintaining a superior connectivity speed to existing network topology schemes. In some configurations, each node can access each additional resource directly with a full bandwidth connection, while in others, although the connection is less direct, it is still improved over existing network configurations. In embodiments of the present invention, the network resources are configured to dynamically change configuration to accommodate changing network topography while each resource (e.g., via the O-NIC card) maintains network communications within the optical cluster, using a multiplicity of channels. For example, while in some configurations each node can access another node directly with a full bandwidth connection, in others, as will be described herein, the bandwidth is split based on maintaining a physical hardware configuration, but applying a different optical switch configuration, thus maintaining peer-to-peer communications. Depending on the number of computing nodes using a shared resource, the path configured for connectivity can vary based on aspects of the present invention (e.g., ring, tree, etc.). Although automatic reconfigurations can occur in embodiments of the present invention in about 1-5 milliseconds (and in some cases, faster), during reconfiguration, connectivity can be maintained based on the two (or more) channels on the O-NIC card as each channel may be reconfigured at different times. This timing is provided as a non-limiting example for illustrative purposes only and not to suggest any limitations.

As will be discussed in more detail herein, four areas of network communications are impacted by utilizing aspects of some embodiments of the present invention. These areas include: 1) the use by applications of standard Linux/PCIe communication methods; 2) communications methods used by default with Legion applications (Legion and its alternatives will be discussed in greater detail herein; 3) interactions of IP and PCIe within systems in which elements of some embodiments of the present invention are implemented, including IP and PCIe interactions within a cluster and routed to the greater Internet; and 4) the implementation of all-Optical WAN links in some embodiments of the present invention.

Before discussing specifics of aspects, certain elements of the technical architecture are noted below and can be kept in mind as the aspects of the invention are further detailed herein. For example, in some embodiments of the present invention, the high-speed communications on clusters depicted run on top of PCIe. PCIe is doing memory transfers (and interrupts and PCIe discovery/configuration) and any other types of communications are layered over DMA. Hence, in embodiments of the present invention, devices and servers write into each other's memory space without the direct intervention of the CPU. PCIe supports both write (push) and read (pull) operations. Transaction Layer Packet Processing Hints can help optimize cache coherency and reduce latency depending on the desired destination of the data. Data may come from CPU registers (single word), CPU cache (up to cache line), or normal memory. Data may go to CPU cache lines (with a suitable CPU pull) or to normal memory. Also, in embodiments of the present invention, the Planned Application Communication Environment (PACE) lightweight protocol interoperates closely with Regent, Flexflow, and the Legion runtime (both discussed herein) to manage physical region movement (data movement between RAM banks). In some workflows, when the producer of a physical region has completed the generation of the region content and unmaps it, PACE will move the data to the consuming thread so that it can start accessing it. Where this workflow is precluded, PACE may configure distributed shared memory with a variety of policies based on the "RegionRequirements" and the number of simultaneous accessing parties—Legion supports many cache coherence policies. PACE will also, in cooperation with the runtime, "lie" (claim memory is ready) to the executing application task when necessary and let it start executing on physical regions before they have been fully transferred—and use hints about data access patterns available to the Legion "Region Accessors" to transfer (for large regions) the data in consumption order instead of in, say, address order. The Accessor underlay is modified to check and wait if data is not yet available or, if done at the page level, potentially cause a page fault to stall the application.

Figure 7:
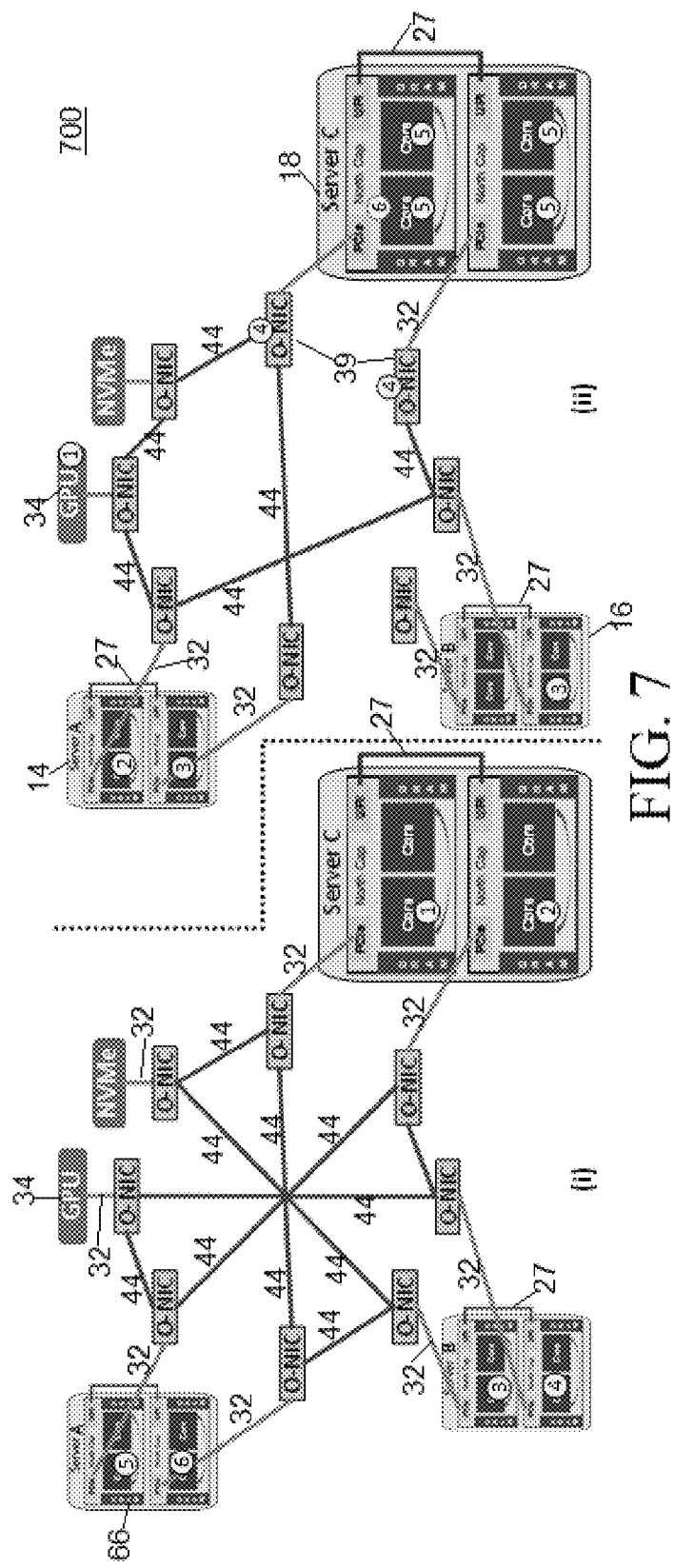
FIG. 7 illustrates the functionality of certain aspects of some embodiments of the present invention.

Data movement in embodiments of the present invention is discussed herein, particularly in reference to FIG. 7. Performing data movement for same-socket threads (requiring at most, page mapping, though usually tasks are in the same address space and may directly use the memory) and NUMA access (requiring simple memory copies from the source to destination address) are not complex and inter-system transfers using PCIe are almost as easy. Instead of calling memcpy( ), the PACE Legion Runtime Module will issue RDMA writes that directly copy the old memory location of the physical region to the new memory location of the physical region. This would typically be done in 4K chunks for large regions, or smaller chunks as necessary. While the data movement can be simple, PACE knows the destination memory address and makes Legion aware of the new is_valid physical region. Since the program code is already aware of the data flows, the program code can proactively allocate memory to each producer (in the consumer's local physical memory). As an optimization, multiple data flows from the same source socket to the same destination socket may share an allocation. PACE on the receiver will transfer information about the memory addresses to the sender's PACE work queue. This address information will also be monitored by the O-NIC Manager security filter (O-NICs are discussed in greater detail later) to track the set of authorized writers. When a region has been fully transmitted, the program code will update a per-flow lockless ring buffer on the consumer with is_valid region information about the new physical region (or partial physical region when consumption ordered transmissions is enabled). PACE on the receiver will poll these ring buffers for changes when Legion consults/requests buffer lists. In examples where WAN connectivity is supported, the program code may add pre-allocated buffer size adjustment based on latency in addition to region size and production frequency. Both sides of PACE have visibility into receiver queue depths and can estimate production and consumption speed. It also allows optimizations of data transfers. When two different tasks—associated with two different pipelines on the same producer CPU socket—complete at approximately the same time, PACE will prioritize the transfer with the smallest receiver queue depth (based on the most recent information and historical trends of consumption speed) to ensure that avoidable pipeline stalls will never occur. When queue depths are large and regions are small, the producer will defer partial (4K) block transmission to provide more efficient data transfers. If the receiver's buffers fill up (meaning a physical memory shortage), the producer can queue data. If both fill up, in some embodiments of the present invention, the present system's high bandwidth can be utilized to queue data on third parties (with suitable connectivity and free memory), in order to improve overall system efficiency by freeing producer computation resources early.

In embodiments of the present invention, PCIe bit errors generate NAK messages, triggering data resends. When NAK messages are observed on the PCIe channel, the O-NIC Manager intercepts and rejects (NAK) all updates to the is_valid ring buffer. This will force the correct ordering of error free data, then metadata instructing the remote side to start using the new data. The PACE sender will unmap (free) the source region based on a timer and the last received NAK time.

The existing extended Legion runtime expects to manage data movement to GPUs by itself using the CUDA GPU driver. Embodiments of the present invention will also allow PACE to pull and push data to GPUs directly, including obtaining data directly from storage elements, to allow processing pipelines instead of the existing "subroutine" style data and control flow paradigms used today.

As aforementioned, embodiments of the present invention provide extensions to ability of PCIe to achieve high-speed, low-overhead transactions across computing systems. While enabling IP over PCIe (for embodiments of the present invention), the resultant system, computer program product, and computer-implemented method: (i) continue to harness PCIe's strengths, and (ii) minimize/avoid introducing complexities for legacy communication, as described herein.

To support IP, embodiments of the present invention use the PCIe Transaction Layer Protocol (TLP) in place of the conventional Ethernet data-link layer. More specifically, the devID/memory addresses carried within PCIe header packets are used by the switches to perform Remote Direct Memory Access to copy packets between the output IP stack of the sender to the input IP stack of the receiver. To support IP-over-PCIe for IP traffic that originates and ends within a LAN/Cluster, a customized Address Resolution Protocol (ARP) performs devID/address lookup (equivalent of MAC address look-up with standard ARP). More specifically, the ARP uses the Legion current mapping list and the resource list to determine the mapping of IP address to the optical addresses and devIDs/mem addresses of the IP stacks on the remote server. Additionally, for each entry (i.e., devID/mem address) our ARP contains permission information (based on user-defined policies) for enabling RDMA and helps prevent unauthorized information access.

The MTU of PCIe is 4 KB without extensions. However, larger (up to maximum 64K size) IP packets can remain unfragmented by sending packet "fragments" in reverse order so that the packet is fully in place prior to the activation of the receiver's IP stack.

The receiving driver can use an approach analogous to existing high-speed network drivers. It will initially request interrupts for the IP stack. If the requests come fast enough, it will switch to polling, where it will check a bit that indicates that work is available. The O-NIC, knowing the polling interval, will check the bit only when needed (instead of for every packet). Note that while this IP connectivity process is efficient, as a layer on top of PCIe and being unaware of NUMA considerations, it can never meet the performance of PACE. For legacy low-volume application communications, it may not be cost-effective to switch to PACE for higher performance.

IP connectivity works when there is either a direct (O-NICs on sender and receiver circuit switched to each other) path between the sender and receiver, or if the planner created an indirect path (relaying through intermediate O-NIC connected to the sender and receiver) and loaded the routing table into the O-NIC. Standard iptables and similar security are available and servers may route IP packets to the Internet.

FIG. 1 is an example of a technical environment 100 into which aspects of some embodiments of the present invention have been integrated. FIG. 1 includes two host computers 110a-110b, which are provided merely as examples of hosts within a given cluster of hosts in a technical environment. Each of the host computers 110a-110b has O-NIC cards 120. In some embodiments of the present inventions, each host comprises at least 24 O-NIC cards, installed in each host computer 110a-110b. When, in embodiments of the present invention, each host 110a-110b has more than one O-NIC card, these O-NIC cards 120 can be connected to multiple destinations, to enhance the cluster network connectivity, or can be connected to a single destination, to enhance the overall throughput between two nodes, or some combination thereof. The dynamic optical switching fabric allows different topologies choices, which will be discussed in more detail herein, to be made and modified in real time, based on demand with full connectivity (if changing one of the two links at a time) and full bandwidth (unlike switched or routed topologies where traffic may collide with each other—even with non-blocking fabric).

Figure 2:
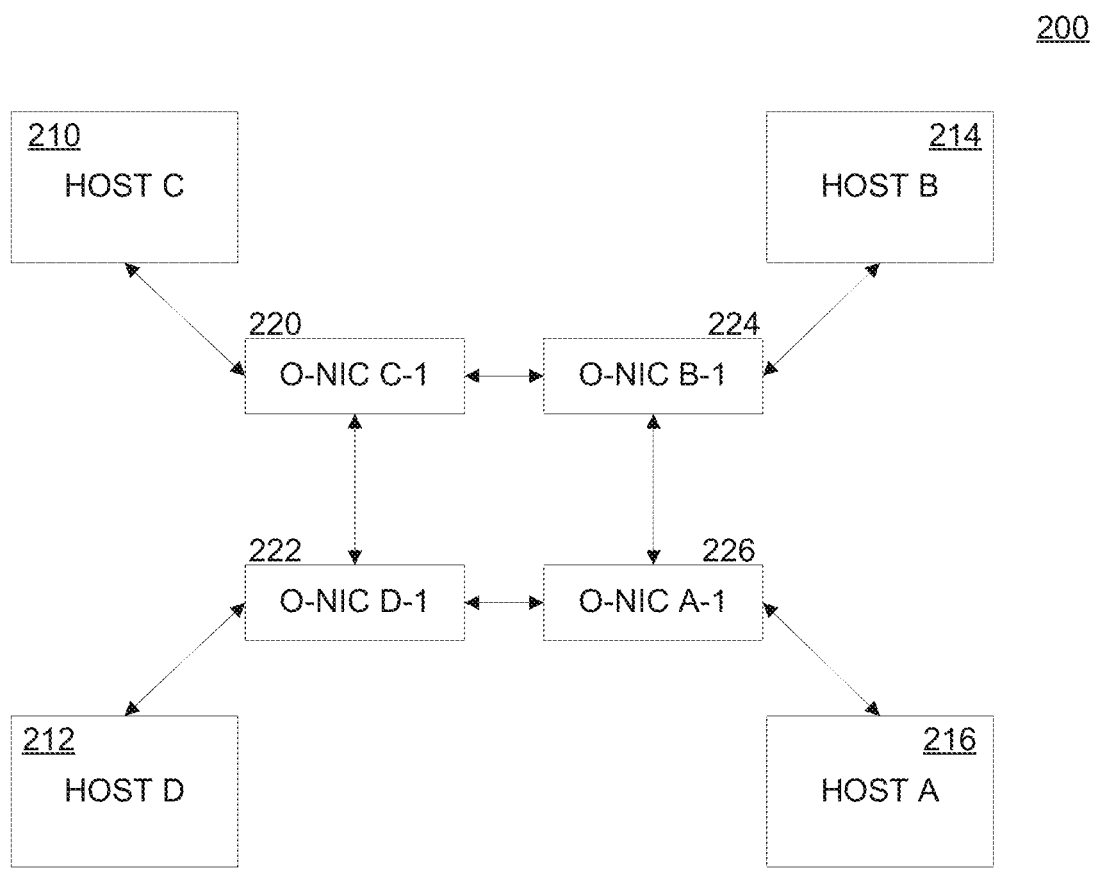
FIG. 2 depicts an example network topology in integrating certain aspects of some embodiments of the present invention.
Figure 3:
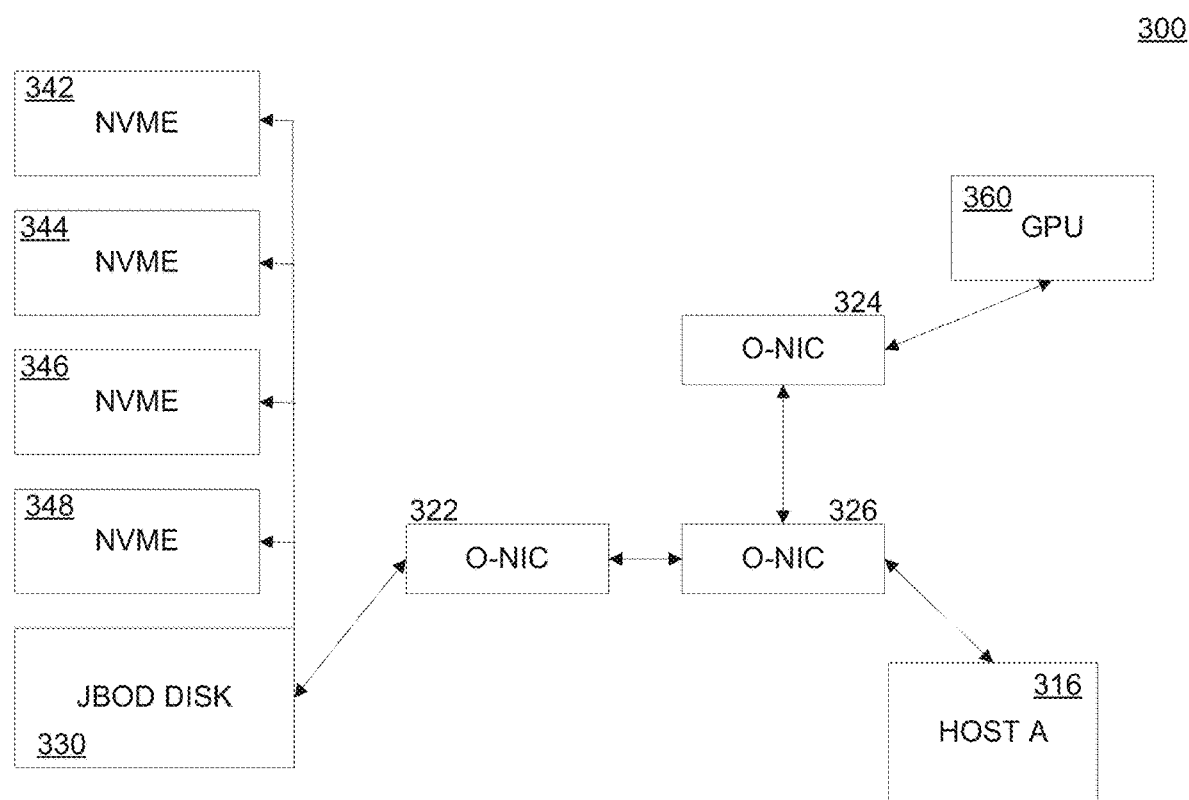
FIG. 3 depicts an example network topology in integrating certain aspects of some embodiments of the present invention.
Figure 4:
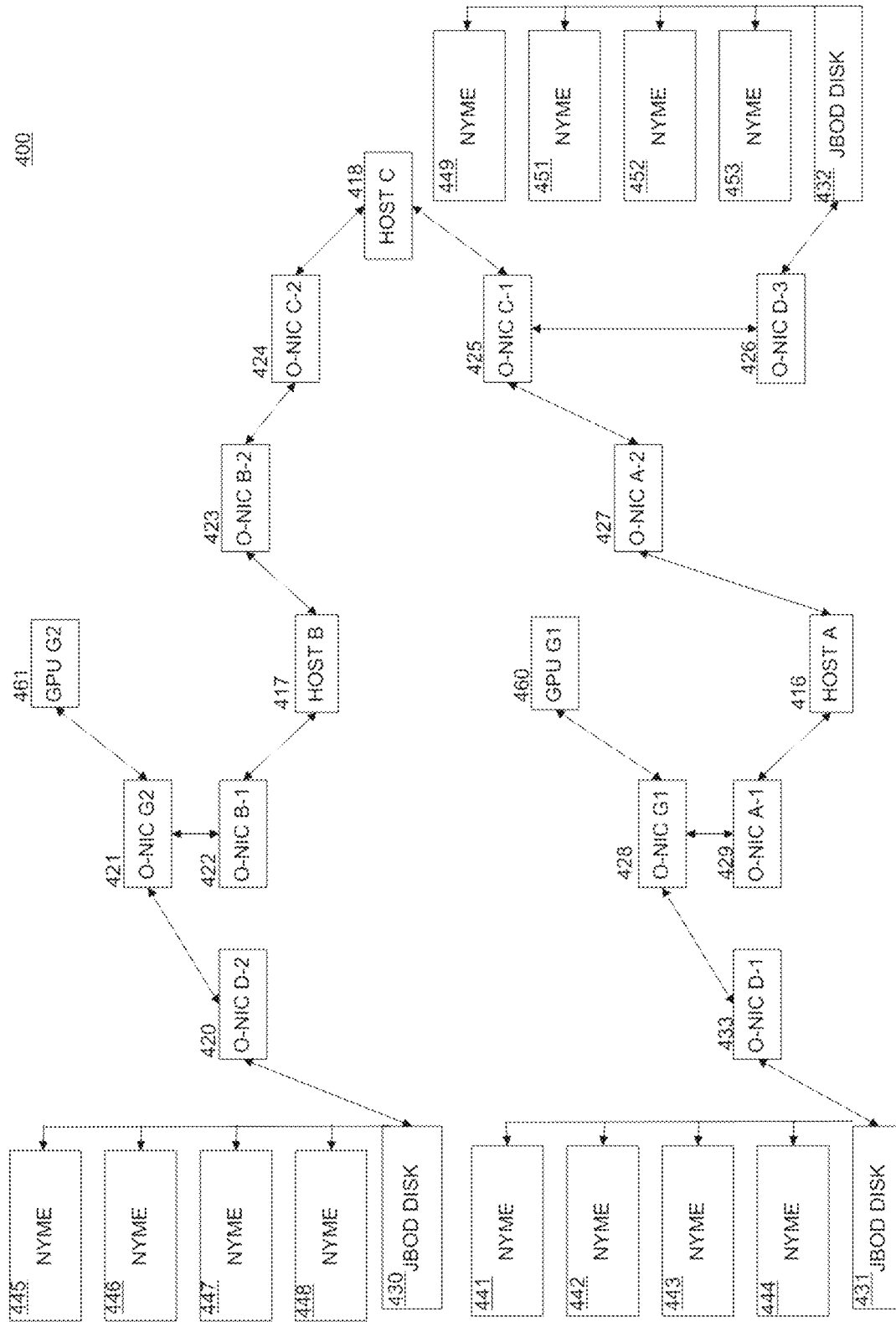
FIG. 4 depicts an example network topology in integrating certain aspects of some embodiments of the present invention.

In some embodiments of the present invention the O-NIC cards 120 are O-NIC cards that consist of a 16-lane (x16) PCIe interface, an FPGA, and two photonics channels. The FPGA, is-responsible for forwarding bits between the host PCIe lanes and the appropriate optical module. Each optical module has a pair of fibers plugged into it; one of the fibers in each pair is used for incoming traffic, and the other is used for outgoing traffic. Each pair of fibers is connected to a MEMS Optical Circuit Switch. Since the O-NIC has two such pairs of fibers connected to the MEMS Optical Circuit Switch, at any moment, the O-NIC may talk to two different destinations. This flexibility allows for complex pipelines of traffic, ring or tree topologies, or seamless partner switching. These various topologies, with the optical circuit switch not present or not depicted for simplicity, are illustrated in FIGS. 2-4. The FPGA handles the multiple output possibilities and handles potential collisions and the program code in embodiments of the present invention plans for switch configuration and reconfiguration.

Retuning to FIG. 1, each O-NIC card 120 has two (or more) bidirectional optical channels, each channel going into a switch 130. In the example of FIG. 1, each resource 140a, 140b, and each host computer 110a, 110b have at least one O-NIC card 120. Thus, connections 150a-150b and 155a-155b can each plug into a O-NIC card 120 and an O-NIC card 120 can either be plugged into or be part of each resource 140a-140b. FIG. 1 illustrates a dynamic topology created by the switch 130 internally, hence, the switch 130 placement in FIG. 1 represents the current topology configured in the switch. As discussed above, each of the host computers 110a-110b can access an additional resource 140a-140b, directly. As will be discussed in greater detail herein, in embodiments of the present invention, each channel on each card may be independently directed. Aspects of some embodiments of the present invention enable any channel pairing to be modified at any time. Each host computer 110a-110b can send and receive, simultaneously, at full bandwidth, in this example, over its connection 150a-150b, 155a-155b to the additional resource 140a-b (the number of additional resources are limited in this example for the sake of simplicity, only), and vice versa. As will be discussed in greater detail herein, in technical environment 100, the host computers 110a-110b and additional resources 140a-140b (as the resources in the cluster) can direct individual transfers to one or more distinct destinations (multiple allowing broadcast, multicast, or flooding topologies) and can also forward data between two optical channels without interaction with the host processor. Thus, in embodiments of the present invention, a fast central processing unit (CPU) or field-programmable gate array (FPGA) on an O-NIC 120 can intelligently forward, direct, buffer, or manipulate network traffic. In some embodiments of the present invention, individual O-NIC cards 120 can simultaneously utilize six times their native PCIe bandwidth. For example, at a given time, an O-NIC card 120 of a host computer 110a can transmit data from host computer 110a to another party, in this example, an additional resource 140a (e.g., a remote resource). At the same time, the O-NIC card 120 could receive response data from an additional resource 140a and forward those responses to the FPGA in the O-NIC card. The O-NIC card 120 can also receive different data from a different remote resource, additional resource 140b and forward the data to the host computer 110a. The host computer 110a can receive (on the O-NIC 120) additional data from the additional resource 140a, and transit this additional data to the other additional resource 140b. Although not pictured in FIG. 1, with more than two network channels or more than two O-NICs, cubes, hypercubes or other network structures could be formed.

In some embodiments of the present invention, the protocol running over the optical channels of the O-NIC cards 120 can be Peripheral Component Interconnect Express (PCIe). The nodes of the cluster, including host computer 110a-110b, can use remote direct memory access (RDMA) to send and receive data directly from each other's memories 160a-160b or to/from PCIe peripherals (e.g., additional resources 140a-140b) attached via their own O-NIC cards 120, to the same optical channels. In examples that utilize RDMA, should security issues occur, these would be resolved by the O-NIC cards 120. Issues could arise due to limitations in the number of mappings in the input-output memory management unit (IOMMU) and the speed of IOMMU changes. In some embodiments of the present invention, O-NIC Manager firmware core running on the O-NIC card 120 (e.g., O-NIC FPGA) performs memory address translation, security filtering, and PCIe Root Complex device virtualization. Although not pictured in FIG. 1, the hardware of the technical environment 100 can include a PCIe device chassis, which, in some embodiments of the present invention, is designed to host 8 PCIe cards that servers around the cluster (e.g., hosts 110a-110b) can use. These chassis contain GPU cards, NVMe RAID cards, or other special devices (e.g., radar, radios, and analog sensors).

In embodiments of the present invention, the use of PCIe provides performance, flexibility, and transitionability and increases throughput and reliability. PCIe performance is doubling approximately every three years, ensuring that 12 Tbps is not a fundamental system limit for servers that are limited to 384 PCIe lanes. PCIe provides a critical advantage, namely the ability to have zero-copy data transfers from the CPU perspective—CPUs, GPUs, or FPGAs can schedule any-to-any direct memory copies (ensuring that necessary data is available to applications just-in-time and that the CPUs and GPUs cores do not need to be further involved in the data transfer process). PCIe also has low protocol overhead, with 0.7% overhead for the typical memory-page-sized transfers. Existing Linux drivers already allow the ability to have distributed shared memory, resolve cache coherence issues, and provide access to servers or devices via PCIe.

Returning to FIG. 1, in different configurations, the relationship between the host computers 110a-120b, and the additional resources 140a-140b, can vary. For example, unlike in some existing systems, in embodiments of the present invention, O-NIC cards 120 can be attached directly to the PCIe peripherals (GPUs, NVMe disks, RADAR cards, etc.) (e.g., additional resources 140a-140b) and can be independent of any particular host (e.g., host computers 110a-110b). Instead, they can be aggregated in a centralized cluster of PCIe peripherals that may be used by any or all hosts on the network (e.g., host computers 110a-110b). However, in another example, a given host 110a can temporarily take full control over what was previously an additional resource 140a that was a central resource, including but not limited to, a GPU and use it with a local program. When this host computer 110a has completed running this local program, the host 110a can make the additional resource 140a available so that another host (e.g., host computer 110b) can use it. In another example, more than one host 110a-110b can, instead of taking full control of an additional resource 140a, in this example, the aforementioned GPU, send data to the GPU and the GPU or O-NIC cards 120, and a program on the GPU could process that data and either send the result back to the host 110 or send it on to the next host (e.g., host computer 110b) that needed that processing result.

Referring to FIG. 1, in some embodiments of the present invention, the hosts 110a-110b can communicate with each other and/or with another device, such as the additional resources 140a-140b, via PCIe memory reads and writes. To enable this route of communication, the memory mappings and semantic meanings of what is associated with the relevant memory are pre-known to the host 110a-110b in order for the host 110a-110b to issue the PCIe direct memory access (DMA) packet to the correct O-NIC card 120. To create these memory mappings, the program code in embodiments of the present invention establishes a PCI Root Complex based on the program code identifying the devices (e.g., 110a-110b) associated with any potential destination and establishing the memory mappings. The program code establishes the memory mappings in this example because, in some embodiments of the present invention, each O-NIC card 120 can be connected with any other O-NIC card 120 and this mapping can change during the lifetime of the program, host 110a-110b, and/or operating system.

In embodiments of the present invention, as opposed to existing systems, where PCI Root Complex negotiation utilizes a dedicated PCIe channel and a strict master/slave relationship, which is not relevant to the dynamic network topology with centralized resources of embodiments of the present invention, the negotiation process in embodiments of the present invention includes virtualization. In this virtualization process, each host 110a-110b establishes a virtual relationship with each potential destination. For a particular graphics card G, the operating systems of the hosts 110*a*-110*b* would all believe that they are the one and only system managing a given additional resource (e.g., 140*a*), such as a GPU (whether or not the hosts 110*a*-110*b* currently have an optical channel connection to that device or not. Indeed, if there are multiple O-NIC cards 120 (e.g., A' and A") on a host (e.g., host computer 110*a*), this host can have multiple relationships with the same physical PCIe resource (e.g., 140*a*-140*b*). The program code does not enumerate the list of PCIe resources and start using all of them, rather, the program code in embodiments of the present invention performs priority-based assignment of such resources (e.g., 140*a*-140*b*) and establishes optical channels and/or routing paths that allow a given host program to use each resource when needed. Program code, in one embodiment running on the O-NIC FPGA, maps the addresses of the devices to map I/O requests from the address space memory address context of a first party to the context of a second party. In some embodiments of the present invention, instead of each O-NIC card presenting all PCIe resources as being locally available via the O-NIC card 120, the O-NIC card presents two instances (provided thee there are at least two optical channels) of each class (e.g. GPU, RADAR card, NVMe disk) of PCIe resources as being locally available. Since the O-NIC card can talk directly to only two other resources this normally does not reduce generality. In this example, program code in embodiments of the present invention can remap the same additional resource 140*a* (e.g., a virtual GPU) to different physical GPU (e.g., additional resource 140*b*) depending on the overall execution plan needs at a moment.

The architecture of embodiments of the present invention, including those aspects illustrated in FIG. 1, can allow flexible transfer and processing of data at about 12 Tbps, in some embodiments of the present invention. In embodiments of the present invention, in addition to the data transfer and processing, the program code also loads large volumes of data, quickly.

In some embodiments of the present invention, program code reads data from NVMe storage disks at ~10 Tbps (currently available NVMe disks are 10% percent slower than full PCIe bandwidth allows) and/or performs direct sensor data gathering, for example through the use of a PCIe radar sensor card or a PCIe digital radio capture card. In embodiments of the present invention, the program code can utilize direct NVMe storage to GPU data transfer without server intervention or resources. The speed at which the data is loaded by the program code is a consideration in performance, as in some examples, 12 Tbps worth of sustained input data is loaded into a cluster for processing.

FIGS. 2-4 illustrate various topologies or architectures employed in different embodiments of the present invention. As discussed earlier, the topology is dynamic. For example, if program code comprising an execution plan finds, learns, or predicts that a large amount of traffic will be exchanged with another host, device, or O-NIC card; the system can be reconfigured so that the O-NIC cards can talk directly to each other, instead of going through an intermediary system. In this way, data flow can be optimized to the specific needs of the current program being executed. These software topologies are software defined (e.g., program code executing on one or more processors can define the topology, dynamically). PCIe is incorporated into embodiments of the present invention to render some embodiments full duplex, meaning that full bandwidth data transfers discussed above can occur in both directions at the same time. In existing systems, separate flow control would be needed for this type of data transfer, but in embodiments of the present invention, the O-NIC cards themselves can handle these without disturbing the host CPUs, Also, error detection can occur with only a very small percentage overhead (absent actual errors). These three different topologies, illustrated in FIGS. 2-4 are provided to illustrate that because each host and CPU has multiple O-NIC cards, embodiments of the present invention can support all three topologies at the same time. These topologies are merely provided as examples as embodiments of the present invention can support a large variety of different topologies. These particular topologies were selected to show a range of support. Additionally, in embodiments of the present invention, topology need not stay fixed throughout program execution. If one phase needs bandwidth concentrated in one topology and another phase needs bandwidth concentrated in another topology, the program code in embodiments of the present invention can reconfigure the network links between those phases.

Referring to FIG. 2, this particular topology is a ring configuration 200 of the O-NIC cards 120 (FIG. 1), with switch 130 (FIG. 1) not present or not depicted, forming a dual counter-rotating ring, with each O-NIC card 220, 222, 224, 2226 sending and receiving data with the next and previous stations in the ring. FIG. 2 includes, for illustrative purposes only and not to suggest any limitations, four hosts 210, 212, 214, 216, each with an O-NIC card 220, 222, 224, 226, where each card is connected to two other hosts. This creates a dual-counter-rotating ring topology. In this example, O-NIC B-1 224 can transmit data to both O-NIC C-1 220 and O-NIC A-1 226 at the same time. Similarly, Host A 216 could transmit data to Host B 214 and Host D 212 at the same time, while one of the first hop O-NIC cards (e.g., O-NIC B-1 224) could transparently forward the data to Host C 210, allowing Host C 210 to receive the data only a few nanoseconds later than Hosts D 212 and Host B 214 and critically without requiring any other host CPU to process or copy the data. Hence, data being received from the previous party may be both sent to the local host as well as being forwarded to the next O-NIC in turn, without host intervention. Similarly, data from the host may be forwarded to both the next and previous hosts, to allow faster data distribution, again without CPU forwarding involvement of the host in each node along the dataflow path. The O-NIC cards 220, 222, 224, 226 could alternatively form a tree and if Host A 216 needs to talk to Host D 212, and does not wish to pay the network reconfiguration penalty (1 ms in one implementation) to talk directly, Host A 216 can route the packet to Host D 212 through Host B 214, where Host B 214 can be connected to Host D 212.

FIG. 3 illustrates an independent host topology 300 where there is an independent host, i.e., from a single O-NIC card (e.g., on a single PCIe x16 slot), and the host can reach either a GPU 360 or a JBOD (Just a Bunch Of Disks) 330 disk array (of NVMe disks-PCIe direct attached storage 342, 344, 346, 348). The host 316 can talk to either the storage array 330 or the GPU 360 at full bandwidth at any time, or if the data directions are different, the host 316 may talk to both at full bandwidth at the same time (e.g., read from the disk 330, write to the GPU 360). In this example, the independent host, Host A 316 communicates via a single O-NIC card, O-NIC A-1 326, and then, via additional communications with other O-NIC cards 322, 326. The specific examples herein are not provided to suggest any limitations, just to show an example if a topology where an independent host 316 connects via O-NIC cards 326, 322, 324, to reach one or more of storage resources 330, 342, 344, 346, 348 and/or a GPU 360.

FIG. 4 illustrates a processing pipeline topology 400, which is more complex than the ring 200 and independent host 300 topologies of FIGS. 2 and 3, respectively. In FIG. 4, an FPGA core runs on the GPU's O-NIC cards (O-NIC G1 428 and O-NIC G2 421) to request input data directly from the NVMe storage arrays. The NVMe storage arrays in this example each include a JBOD disk 430, 431, and NVMe disks, in the storage array 431 accessed by O-NIC G1 428 on healf of GPU G1 460, and in the storage array 430 accessed by O-NIC G2 421 on behalf of GPU G2 461, NVMEs 445, 446, 447, 448. The input data is forwarded directly to some user application code running on the GPUs (G1 and G2) 461, 460. That user code transforms the input block and then outputs it to the next stage of the processing pipeline, O-NIC A-1 429 and O-NIC B-1 422. This can be done while simultaneously receiving the next input block from the disks. On those two O-NIC cards, O-NIC A-1 429 and O-NIC B-1 422, user application code loaded into the FPGA can perform the next transformation step, at full line rate, and the output of that step can be forwarded to their respective hosts (Host A 416, Host B 417). Application code running on Host A 416, Host B 417 would execute against that input block, transform it, and output it to the last processing step, specifically by transmitting the output to Host C 418 through the respective O-NIC cards, including but not limited to, in this example, O-NIC A-2 427 and O-NIC B-2 423 (to O-NIC C-2 424 and O-NIC C-1 425). Host C 418 would aggregate the data from Host A 416 and Host B 417, and output the aggregate data to the output storage JBOD D3 432 (or the (e.g., NVMEe) disks 449, 451, 452, 453 that may be assembled into a RAID cluster), in this example, via O-NIC D-3 426. In this example, assuming the processing elements are streaming and fast, the whole processing pipeline in this topology can have up to about seven times the O-NIC bandwidth in flight associated with this one processing pipeline without processing stalls; or if all O-NICs were engaged in this topology using and embodiment with 24 O-NIC cards on a single server, approximately 84 Tbps of data in flight at all times.

Figure 5:
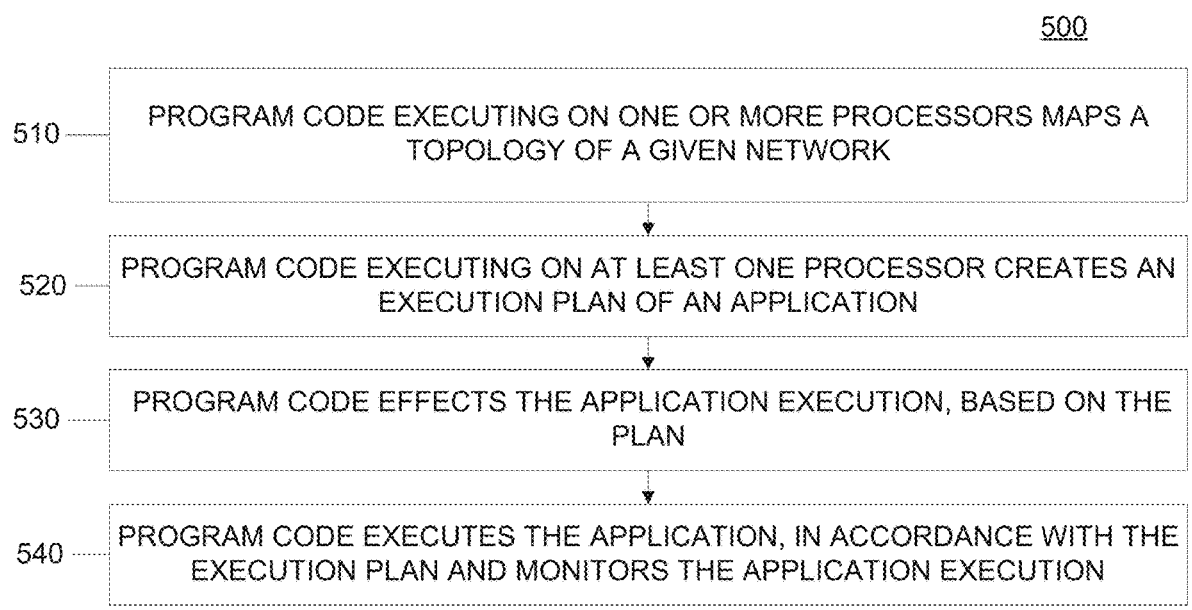
FIG. 5 is a workflow that illustrates various aspects of some embodiments of the present invention.

FIG. 5 is a workflow 500 that illustrates, very generally, certain aspects of some embodiments of the present invention. FIG. 5 illustrates a process by which embodiments of the present invention generate dynamically reconfigurable flexible pipelines providing direct access to shared resources and take advantage of the inherent locality of parallel programs to connect each executing task with the parties with which it communicates, and transferring data at the full bandwidth of the system just in time for processing. Generally speaking, in some embodiments of the present invention, program code executing on one or more processors maps a topology of a given network (510). For this aspect, some embodiments of the present invention can take advantage of certain existing code modules to implement various aspects. Additionally, the execution of the program code in embodiments of the present invention can be managed by an existing programming management/execution system, including but not limited to Stanford University's Legion, for writing high-performance applications for distributed heterogeneous architectures. Legion, which can be utilized in embodiments of the present invention, works with natively coded applications (e.g., in Python or C++) that are annotated by the programmer to describe the relationship between executable code blocks and memory regions. Legion has multiple domain-specific languages and run-times, including Regent and FlexFlow, which combine static and dynamic analysis of parallelism to automate this process, discovering the available parallelism, then using Legion to execute the tasks. Specifically, in some embodiments of the present invention, the program code utilizes Legion to the decomposition of an application into parallel components, but adds several components to take advantage of expedited data transfer, between application tasks, across a variety of interconnects. Thus, proprietary program code and/or an existing model can be utilized to create a network topology (the optical switch configuration assigning O-NIC communication circuits) and the assignment of tasks to servers, sockets, cores, GPUs, and FPGA Application Accelerator Firmware Cores (e.g., 510). When discussed herein in the context of O-NICs, Application Accelerator Firmware Cores are user program code executing on a computing element, including but not limited to a FPGA, embedded in the O-NIC to allow application acceleration or in-flight data transformation. Thus, the Application Accelerator Firmware Core Controller is a mechanism to install and execute the application accelerator firmware in the O-NIC FPGA to increase total cluster processing capabilities and improve effective data rate and latency.

In some examples, PCIe extended into the optical domain, an aspect of embodiments of the present invention, when combined with Legion distributed applications, results in these applications having have high-performance and seamless access to data anywhere in an execution cluster without any explicit actions other than optical interconnect switching.

Returning to FIG. 5, in embodiments of the present invention, based on the topology, program code executing on at least one processor creates an execution plan of an application (520). Program code in embodiments of the present invention which can be understood as a planner, moves the code to the data, the data to the code, and/or transforms the data in-flight. For example, if a particular application requires more resources (CPUs, GPUs, FPGA, or network bandwidth) than are available, the program code of the planner will break the application up into phases where the network topology and resources can be reassigned to a new configuration to continue the application processing pipeline, generating the execution plan. In embodiments of the present invention, the program code of the planner deploys parallel tasks and memory regions in the specific context of the hardware solution of the technical architecture (see, e.g., FIG. 1). While Legion (or a similar solution) is cognizant of bandwidth constraints, the slow-changing (compared to CPU execution speeds) pair-wise MEMS optical circuits established for the O-NICs can make planning a parallel application more challenging. The program code of the planner optimizes, to make effective, use of the two fiber ports per O-NIC, as well as making (appropriate) trade-offs between on-CPU-socket transfers, UPI intra-CPU transfers, and PCIe transfers between servers (and between clusters). As understood by one of skill in the art, the techniques and tradeoffs listed herein are not limited to the transfer technologies listed. The technologies listed are provided as non-limiting examples to illustrate various aspects of some embodiments of the present invention, with clarity. The program code of the planner also provides extensions to the existing functionality of Legion or similar technologies, when utilized, such as FPGA Application Acceleration Firmware Core computing, multi-path transfers using the dual optical paths in an O-NIC, direct device-to-device transfers, optimized access to NVMe storage, and so on. Program code in embodiments of the present invention enhances the Legion/Realm (or similar technology)

run-time monitoring to be aware of the PCIe topology and to determine when to re-plan in response to stalls in the application pipeline.

Returning to FIG. 5, as discussed below, just as existing modules can be utilized to map the network topology (510), in some embodiments of the present invention, the program code, upon generating the execution plan (520) can interface with an existing API for execution, including but not limited the Legion planner API. The execution is discussed below.

Based in the program code of the planner establishing the execution plan (520), the program code effects the application execution, based on the plan (530). In some embodiments of the present invention, the Legion runtime will call a module, which can be an existing system (as an example), such as Realm to effect the application execution. Underneath Legion, the Realm run-time library manages asynchronous task execution, synchronization, and monitoring. Realm, in cooperation with the Realm Modules below it, will start and monitor execution of the application. Hence, in some embodiments of the present invention, program code executes the application, in accordance with the execution plan and monitors the application execution (540). In examples of embodiments that utilize the Realm Modules, the program code can utilize these modules to deploy and execute the application on CPUs, on accelerated cores on FPGAs for in-flight low-latency data processing, configure peer-to-peer direct NVMe storage to GPU processing pipelines, and using a data transfer scheduling system for data delivery.

In embodiments of the present invention, users can utilize the program code to activate hardcoded cluster network topologies—for example to allow a legacy application to read data from NVMe disks using standard filesystem APIs or to turn the entire cluster and/or a portion of the cluster, into a distributed shared memory system, where application threads running on different servers may transparently access memory from other servers. As discussed in reference to FIGS. 2-4, all configuration and topologies are available, but will typically be static throughout an application execution. However, high performance complex applications can run faster if a system such as Legion, together with certain aspects of embodiments of the present invention described herein, can manage their execution since they are tuned to specific execution considerations.

The program code referred to in reference to FIG. 5 as the planner is compatible across many different hardware and software architectures. The technical architecture, as described in FIG. 1, represents a novel hardware configuration which can execute legacy applications. Additionally, the Network Subsystem Software discussed herein can also be used on other hardware architectures. The intelligence of the program code referred to as the planner (including with related changes to the Legion runtime) is applicable to any hardware solution. Certain of the Realm modules can also be adapted for alternate hardware solutions.

As illustrated generally in FIG. 1, embodiments of the present invention include a novel optical hardware acceleration technique which can be deployed on a network with COTS components, based on the PCIe standard. Embodiments of the present invention enable application developers to build a custom hardware solution from available resources (CPUs, GPUs, and FPGAs). In embodiments of the present invention, the use of PCIe to attach the O-NICs accelerates acceptance, deployment, and transition through use of proven, widely-available attachment standards. While products from companies such as Dolphin permit servers to use PCIe to access memory and devices within other servers, that approach has significant restrictions: (a) Resource sharing requires double-PCIe bandwidth/lanes, latency, and server PCIe controller resources; (b) latency is high; (c) it cannot scale to the same bandwidth (even theoretically) while still having "other" PCIe devices; and (d) there are no user-accessible computing resources on the PCIe Optical NIC. None of these restrictions is a restriction of an embodiment of the present invention.

Some embodiments of the present invention utilize PCIe, which eliminates the higher protocol layers and their concomitant overhead which are associated with existing high performance network systems typically have high protocol overheads, compared to PCIe. Some existing systems add layers to access the PCIe, which these embodiments of the present invention do not. Without the all-optical interconnects utilized in embodiments of the present invention, network latency is typically much higher. Typical high performance computing interconnects are usually fixed to a static topology, like a torus or n-dimensional torus variant. This provides a standard semi-adequate communication mechanism and application developers spend long hours tailoring their application to a specific hardware instance. If a particular application (such as protein folding) needs a different communication pattern from another (weather simulation)—or if different numbers of GPUs are needed on different systems—there is nothing that can be done. In embodiments of the present invention, high-speed physical interconnection and hardware resources are tailored to match each application needs, to building a new hardware cluster. As discussed in reference to FIG. 5, the program code comprising the planner can automatically place code and data throughout (and in) the network to optimize application execution without expensive manual optimization by developers. PCIe in the optical domain allows fine-grained direct memory transfers between servers or devices without the disadvantages of a shared bus. In embodiments of the present invention, a MEMS optical circuit switch (or other optical interconnect technology) can be configured to circuit-switch any pair of endpoints without contention all of the way into the CPU package of the server, compared to bus-based systems that may have high performance in limited benchmarks but suffer high degradation under load. Each Optical NIC (O-NIC) utilized in the technical architecture of embodiments of the present invention can has two sets of fibers to permit it to communicate with two destinations without switch reconfiguration, and as discussed in reference to FIG. 1, each node in a cluster has many O-NICs to provide the flexibility to communicate with other nodes, GPUs, and NVMe storage at their maximum speed.

In embodiments of the present invention, the use of two optical ports on the O-NIC card allows sophisticated data flows. Since each port is associated with a single destination between planning cycles, the O-NIC is usable for simultaneous reads and writes to different parties, simultaneous forwarding of incoming data to local and remote destinations, and other interesting topologies, including but not limited to the topologies of FIGS. 2-4. For example, as discussed above in a non-limiting example, since it can take close to 1-5 ms to reconfigure the MEMS switch to change destinations, the O-NIC can use one port as the other undergoes reconfiguration. If multiple O-NIC cards are attached to the same server, as is typical, each O-NIC card may be attached in a different topology or to different parties at the same time if communication flexibility is needed over high point-to-point bandwidth.

In some embodiments of the present invention, FPGA technology provides the O-NIC card solution. FPGA are widely known to accelerate system and user applications. Yet a key limitation of PCIe to date is that all traffic from one PCIe device to another must pass through a host CPU PCIe controller. As discussed above, embodiments of the present invention eliminate this requirement and allow peer PCIe devices to talk directly to each other using the O-NIC. In some embodiments of the present invention, the program code drives the application logic from an O-NIC FPGA without the user to writing special code to support this paradigm for the FPGA or any of the devices on the network (e.g., FIG. 1) to talk to each other. For example, in some examples, the GPU receives data from, e.g., a file system stored on a storage device (NVMe or other) (see, e.g., FIGS. 3-4). In some examples disclosed herein, and application driver running in the FPGA can request data from the storage over the optical network, parse the data (potentially providing a file system interface in the FPGA within the O-NIC), send it to the GPU for processing, and while it is being processed request the next chunk of data. In other words, a GPU can stream data from NVMe without involving any the host CPU or the CPU's PCIe links (see, e.g., FIGS. 3-4). The FPGA can filter and preprocess data, limiting what is ultimately passed to a CPU. The runtime commands, which program code in the memory paths will use at any given time, enable the O-NIC and optical switch to restrict access to specific memory ranges within a pair of authorized endpoints, so that operating system or other application memory cannot be accessed. In some embodiments of the present invention, security is improved by utilizing this described circuit switching because traffic cannot be "spoofed" by third parties; the optical path pins down the communication path, unlike in shared-bus or packet switched solutions, where spoofing can be achieved.

As described in FIG. 5, which illustrates a general workflow 500, in embodiments of the present invention, the software, which includes the Network Subsystem Software, when executed on one or more processor, extracts a maximum performance from an application by precisely matching its parallelization structure to the underlying hardware. To provide this functionality, the network subsystem software analyzes and understands the trade-offs among alternative execution plans and communication topologies.

In some embodiments of the present invention, the application environment manages data movement as tasks finish with stages of their processing. Program code that controls FPGA acceleration and firmware permits applications to use the FPGA on the O-NIC in the technical environments of the present invention.

In embodiments of the present invention that utilize Legion, logical regions are also present as a primitive of the Legion environment. The logical regions have data associated with a task and then migrate the data to another task for further processing. In embodiments of the present invention, these tasks can be on different cores within a sub-motherboard blade, on another blade, on another server, or even on another cluster. The runtime, e.g., using Planned Application Communication Environment (PACE), makes the data available when it is needed and ensures consistency and performance.

In embodiments of the present invention, to allocate resources, the PCIe channel bandwidth is managed over time. By utilizing an optical switch in embodiments of the present invention, PCIe slots can be routed to different destinations. In embodiments of the present invention, the program code can utilize Legion for resource planning and runtime system. The program code can also separate the generic planning process from the Realm aspect of actually configuring real hardware and operating systems components for execution and "modules" for new classes of resources. These existing functionalities of Legion enable the program code, in embodiments of the present invention to enable new functionality and new datapaths (such as direct NVMe-to-GPU communication or FPGA application processing). Program code of embodiments of the present invention interacts with Legion such that Legion can understand these configurations.

In embodiments of the present invention the program code referred to herein as the planner supports larger scale applications by supporting multi-phase computation while minimizing interphase delays. Between phases, either memory or code or both may be moved around by the program code to create a more optimal execution environment for the next phase. For example, during batch synchronization, it may be more important to have lower latencies as opposed to higher aggregate bandwidth between computation functions. This could involve the program code in an embodiment of present invention moving data from a dozen different GPUs to the local memory of a single socket of a large-memory compute server to reduce the overall computation time. When this program code utilizes Legion (as one example) the fundamental data abstraction in the Legion programming model is a logical region. Thus, each task in an execution tree specifies which region(s) it acts on, as well as privilege and coherence requirements, to enable hierarchical and distributed scheduling. When a task finishes updating a region, the planned application communication environment is responsible for migrating its data to the task that will next access it. The environment provides a reliable application- and computation-aware transfer protocol that prioritizes transmissions based on memory pressure (at both the source and destination), bandwidth pressure, and execution pipeline stalls.

In some embodiments of the present invention, as illustrated in FIG. 5, the program code monitors runtime execution to handle irregularities, such as, but not limited to, stalled processing pipelines. This aspect of the present invention, in some embodiments, can be initiated by Legion and resolved by the planner revised plans causing revised resource assignment. Based on the monitoring, the program code automatically performs necessary optical switch reconfiguration to support using other resources to rescue lagging executions—based on the new resource allocation decisions made by the planner using live information. Thus, the environment can adapt to alternate access patterns (e.g., input array stride size, row first, or column first access patterns) to trade network efficiency for processor stalls. The environment and Legion are used for communication involving both general-purpose computers, FPGAs, and GPUs, so that application developers do not manually resolve communication synchronization and instead can write execution blocks (as the synchronization is resolved by the program code, automatically).

When embodiments of the present invention utilize Legion, these embodiments extend the existing functionality of Legion to enable functionality that was not possible before the introduction of these enhancements. For example, Legion has extensive profiling capabilities, which software in embodiments of the present invention extends to understand the hardware environment (e.g., FIG. 1) (i.e., the PCIe interconnect and the FPGA functionality). In addition to reacting to unexpected behavior in the current execution, runtime monitoring is utilized in embodiments of the present invention to provide feedback for future iterations of the deployment, refining the plan produced by the program code referred to as the planner the next time the application is run. This unsupervised and/or supervised machine-learning can automatically improve subsequent executions of the program code. Additionally, developers can also use information gathered by runtime monitoring to adapt their applications to better use available resources.

Figure 6:
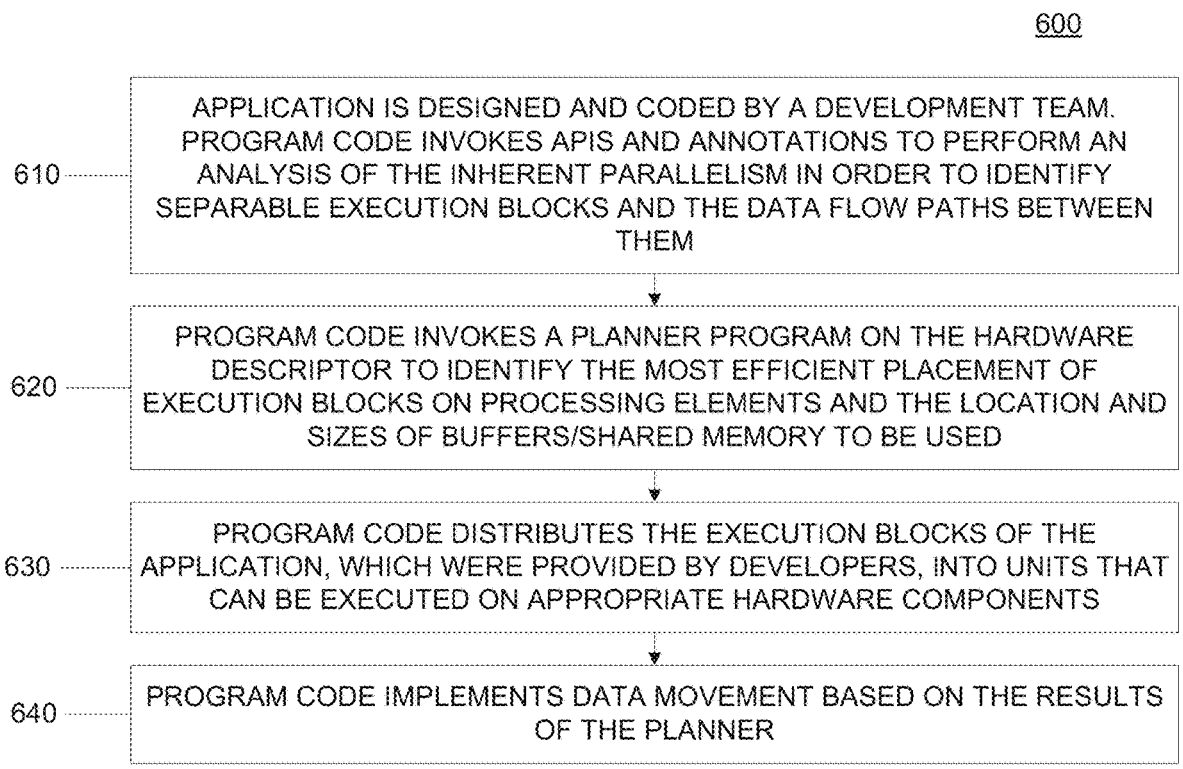
FIG. 6 is a workflow that illustrates various aspects of some embodiments of the present invention.

Using Legion and/or FlexFlow, embodiments of the present invention map parallel constructs onto the underlying hardware using knowledge of the constraints and characteristics of the infrastructure. Program code in embodiments of the present invention applies pipelines which may be extensive in order to take full advantage of the uniqueness of the underlying hardware design. To this end, the use case of FIG. 6, which is illustrated as a workflow 600, provides an example of deep learning, image classification problem, and improvement to an application's performance by program code in embodiments of the present invention that include the program code applying both fine-grain (in the classification stage) and coarse-grain (in the feature learning phase) parallel processing. As illustrated in FIG. 6, an application is designed and coded by a development team. Program code invokes APIs (e.g., Legion/FlexFlow APIs) and annotations to perform an analysis of the inherent parallelism in order to identify separable execution blocks and the data flow paths between them (610). In this analysis, the program code identifies elements that require fine-grained parallelism, as these will have stringent placement constraints on the memory that is common to the involved tasks. Application elements that are more coarse-grained can be more easily distributed in systems in which aspects of some embodiments of the present invention are implemented because their direct interactions are minimal. The program code invokes the (earlier described) planner on the hardware descriptor to identify the most efficient placement of execution blocks on processing elements and the location and sizes of buffers/shared memory to be used (620). In some examples, the planner uses an infrastructure descriptor that provides the constraints and capabilities of the processing elements and communications methods that are available in the hardware utilized in embodiments of the present invention. The program code utilizes a runtime (e.g., the Legion/FlexFlow runtime) to distribute the execution blocks of the application, which were provided by developers, into units that can be executed on appropriate hardware components (630). For example, some units may be limited to particular devices such as an FPGA, but others may be able to run on multiple components such as either a core or a GPU. This distribution provides greater latitude to the planner when mapping an application to the hardware. Program code implements data movement based on the results of the planner (640). The classification phase (630) illustrates various unique features of the software/hardware design, including but not limited to, a uniform data movement methodology to the application middleware. The program code can therefore implement data movement in a variety of ways and selects the mechanism to deploy based on the results of the planner (640). The use of transport memory distribution replication is especially relevant to high-performance applications, where the same data are needed by multiple tasks and the overhead of such accesses may become a bottleneck, clogging the pipeline.

In some examples, feature learning pipelines populate a first layer of neurons of a neural network, and the program code calculated values of the neurons in a next layer based on those values, the current set of weights, and/or application specific algorithmic computations. In a given non-limiting example, there may be millions of neurons to compute, and an output value for each neuron is independent of all others, program code in embodiments of the present invention (e.g., Legion) recognizes this as a natural place for parallelism. However, the placement of processing elements and the source of the common data for each element can impact the speed of the overall computations (e.g., slowing the computation speed). Thus, the program code comprising the planner can evaluate various alternatives. For example, the program code can perform a simple mapping, which places one task on each of a number of cores on a given CPU. Each task would access the same block of memory, but only touch the subset of neurons that it is assigned to process. However, this leads to contention on the data paths from the cores to the common memory. Alternatively, the program code can perform a simple mapping, as described in the preceding example, but the program code can duplicate the output block into multiple, read-only replicas, and assign one to each task/core. This incurs the expense of a copy, but allows the tasking to run faster. The program code can also place the subsets of neurons that each task will process in independent memory blocks before the initial processing occurs. Since the planner is responsible for assigning the memory buffering to a task, and since it has a priori knowledge of the subsequent tasks, this placement can be planned in advance of execution. This optimization is not visible to the application. In some situations, the program code can make different core-to-memory assignments. While on the surface, all cores and memories appear to be equivalent, there are subtle differences that can severely impact performance. The planner is aware of any affinities or aversions with respect to core-to-memory accesses and interference. Specifically, a CPU may contain sets of cores that have preferential access to certain banks of memory with respect to other sets; hence memory placement should consider this case. However, the tiling of cores and memory controllers in a CPU can have dedicated pathways that can interfere with the accesses of other cores, so there exist core-to-memory assignments where certain combinations will reduce the effective processing bandwidth. Therefore, such pairings will be down-played by the planner.

If more than tasks are needed than exist on a single CPU, the program code can place sets of tasks on separate CPUs (different blades or clusters). In this example, the planner utilizes aspects of examples of the PCIe design disclosed herein to perform the replication as part of a chained movement of data through all the CPUs. This avoids memory copies while significantly expanding the potential pool of resources. With the Legion extensions, as execution of programs vary from expectations or errors occur, as the normal part of system operation, Legion discovers these irregularities and automatically starts to remediate the application execution. The planner may reallocate network bandwidth and available resources and memory distribution to recover from a failed or slow execution.

In embodiments of the present invention, the program code comprising the planner enables applications to extract the full benefits and speed of the hardware, including the novel O-NICs, FPGA firmware and reconfigurable optical switch. The program code of the planner maps the Legion application task tree to physical resources such as local and remote CPUs, GPUs and FPGAs, as well as shared, zero-copy memory and NVMe memory, in order to make the application run efficiently. Simultaneously, the program code of the planner co-optimizes network topology by selecting a MEMS switch configuration matching application data flow. Thus, in embodiments of the present invention, the planner balances the application workload, and minimizes task communication cost. The planner, which can be implemented as Legion custom planner(s), in some embodiments of the present invention, in these embodiments, significantly extends the Legion default planner to the technical architecture described herein.

In embodiments of the present invention, the planner models the mapping problem as a graph partitioning problem, based on two graphs: $G_A=(V_A, E_A)$, the application task graph, and $G_T=(V_T, E_T)$, the physical topology graph. The elements of $V_A$ are called 'vertices' (application compute tasks), and the elements of $V_T$ 'nodes' (compute nodes such as CPUs, GPUs, FPGAs, and the MEMS switch as well as memories (zero-copy, NVMe)). Nodes have attributes such as processor type and speed, memory type and capacity. The nodes in $G_T$ are connected by edges $e \in E_T$ representing e.g. UPI buses and PCIe channels. The presence of an edge expresses and affinity between e.g. a processor and memory, or a processor and the MEMS switch. The edge has attributes such as bandwidth or latency (shared entities like Layer 2 cache and memory buses, are depicted as aggregated edges with shared attributes). The number of PCIe edges reflects the physical topology of the cluster: each O-NIC has two PCIe ports: $\Delta_{max,PCIe}=2$. Similarly, the total number of PCIe edges in $G_T$ connecting to the switch reflects the maximum number of ports on the switch, which is $\Delta_{max, switch}=384$. In order to run the application, the planner needs to map each task vertex to a compute node, and route each data transfer along a shortest route in the physical topology graph from the compute node running its 'source' task to the compute node mapped to its 'destination' task. There is large preference to minimize the routing distance, e.g. 1-hop (direct connection) or even 0-hop (shared memory). For example, if these compute nodes are neighboring cores, then page mapping can be utilized so that the two nodes can use the same physical address. If the compute nodes are two CPUs in the same server, they can use the UPI on the motherboard that allows sending memory data between CPUs. If the source and destination are two servers, they can use the PCIe channels on the O-NIC to communicate. The planner trades off bandwidth, latency, bus contention and cache contention, in order to optimize placement of tasks. FIG. 7 depicts a planner execution plan comprising: 1) initial allocation of six tasks to cluster resources; 2) the program code of the planner optimizes task allocation using cluster resource cores GPU, and O-NICs.

Figure 8:
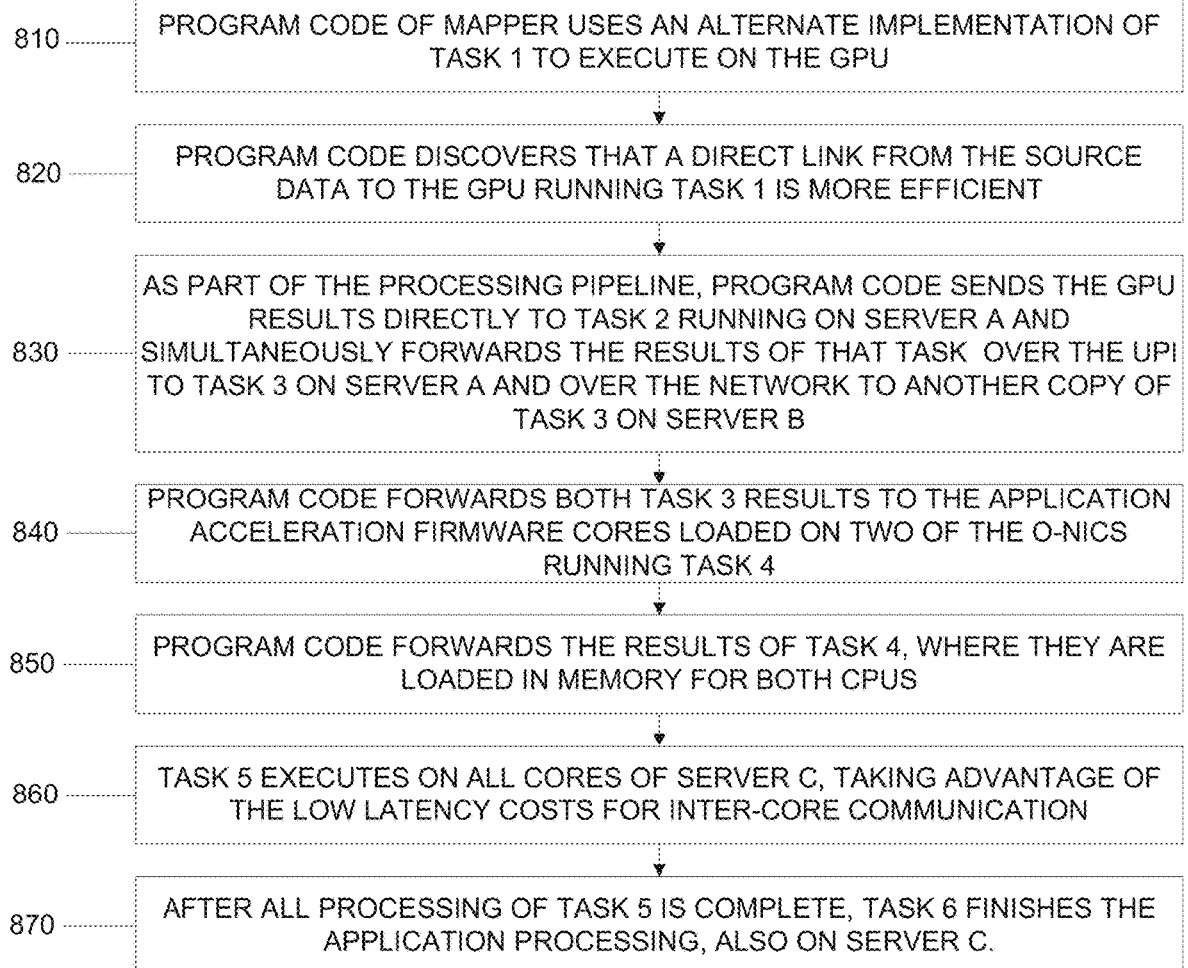
FIG. 8 is a workflow that describes certain aspects of FIG. 7.

FIG. 7 depicts the result of planner processing 700. The initial chordal optical switch configuration and task mapping are shown in FIG. 7 (*i*). FIG. 7 (*ii*) shows the result of planner co-optimizing task placement and optical switch link configuration. In FIG. 7, optical NIC PCIes are designated 32, optical fibers are designated 44, UPIs are marked 27, and memory buses, in this case, dynamic random access memory (DRAM) are pictured with one such element marked 66, as each DRAM is also separately labeled. FIG. 8 is a workflow 800 of a planner executing on the GPU 34. Throughout workflow 800, references are made to various elements in FIG. 7, for illustrative purposes, only. Thus, the progression of the workflow 800 is illustrated in both FIGS. 7 and 8. In FIGS. 7 and 8, the program code of the planner uses an alternate implementation of task 1 to execute on the GPU 34 (810). The program code discovers that a direct link from the source data to the GPU 34 running task 1 is more efficient (820). As part of the processing pipeline, the program code sends the GPU 34 results directly to task 2 running on server A 14 and the program code simultaneously forwards the results of the task over a unified payment interface (UPI) 27 (specifically, the UPI 27 at server A 14) to task 3 on server A and over the network to another copy of task 3 on server B 16 (830). The program code forwards both task 3 results to the Application Acceleration Firmware Cores loaded on two of the O-NICs 39 running task 4 (840). The program code forwards the results of task 4 are forwarded to server C 18, where they are loaded in memory for both CPUs (850). Task 5 executes on all cores of server C 18, taking advantage of the low latency costs for inter-core communication (860). After all processing of task 5 is complete, task 6 finishes the application processing, also on server C 18.

Thus, in embodiments of the present invention, the program code jointly plans switch configuration and task mapping. First, the program code finds a good task partitioning independent of topology (switch) constraints, and then, finds a good initial topology (meeting switch constraints) taking into account structural information in the task graph. Second, the program code updates the task mapping based on the 'initial' topology. Third, the program code utilizes iterative improvement via stochastic search (e.g., Markov Chain Monte Carlo (MCMC)) to improve on the initial solution, until the planner solution is satisfactory or upon reaching a maximum iteration or time limit. In some examples, first, the program code finds a task partitioning only taking into account the application task graph $G_A$. Graph partitioning (and optimal mapping) is an NP-hard problem in general, so the program code utilizes heuristics in order to solve this approximately, based on the stated main objectives: balancing the application workload, and minimizing task communication cost. To achieve this, balanced edge partitioning is can be utilized in some embodiments of the present invention for machine learning and graph applications, since this typically keeps large data transfers within partitions, and minimizes vertex copies. Embodiments of the present invention utilize edge partitioning, for example, where partitions consist of consecutively numbered vertices (including all edges that point to them), is better than vertex partitioning due to lower expected communication costs. To partition into K partitions (allowing execution parallelism), the program code selects K−1 cut points. The program code utilizes a greedy heuristic, where each vertex $v_i$ in $V_a$ has a weight $w_i$ associated with it, which is roughly proportional to the task completion time, and the total execution time of all tasks in partition k is roughly proportional to the sum of the weights of the vertices in it: $\Sigma_{i \in partition k} w_i$. The task completion time is the time to load the data and compute on the data. An initial estimate of task completion time is based on task completion time annotations in the application task tree, or on a task completion prediction model. One advantage of the system architecture disclosed herein is its use of PCIe in the optical domain, leading to less contention compared to shared buses. This architecture simplifies estimation of e.g., data transfer times. Based on the partial weight sums function, it is straightforward to pick the K−1 cutpoints.

The initial topology for O-NIC devices selected (driven in part by the constraint $\Delta_{max,PCIe}=2$) is a chordal ring topology. Chordal ring topologies have long been studied theoretically as good choices for interconnect design, e.g., for their robustness against edge/node failures, ease of routing, as well as high bisection width, an indicator of resilience against congestion. The two PCIe channels for every O-NIC allow a ring topology; two devices are endpoints of an edge in $G_T$ when they can communicate via PCIe, or another channel such as e.g., the UPI or shared memory. Configuration and reconfiguration of the topology consists in determining exactly which O-NIC/PCIe devices connect to which other ones. Initially, the program code considers a symmetric assignment, with each cluster connected to other clusters, and servers, CPUs and GPUs connected in a similar way. During MCMC iterative optimization, the program code can break this symmetry, to support parallel processing of heterogeneous task subgraphs, for example. This is determined after mapping the (partitioned) task graph to the (partitioned) initial topology, and estimating the task completion times. The program code attempts to map all tasks to a resource. If there are more task than can be accommodated, then the program code splits the mapping into multiple phases.

After an initial mapping, the program code in embodiments of the present invention iteratively improves the mapping via stochastic search, e.g. MCMC. Here, the program code will 'perturb' the current solution S randomly by changing the mapping of one task, or changing the topology by one edge at a time. For example, the program code can connect a CPU to an NMVe, instead of to another CPU. This creates an alternative solution S'. The alternative solution is accepted with probability $p(S'\setminus/S)=\min$. i.e., an improvement is accepted, and sometimes a deterioration can be accepted (to help escape local minima). This process repeats until reaching an iteration limit or time limit—good mappings can be generated in seconds, close-to-optimal mappings in minutes. The program code can use it to generate a better static solution, or, based on feedback from monitored actual task execution times, to dynamically change the application mapping or network (switch) topology after an application phase (iteration) ends. Once an initial mapping is chosen to execute the tasks, the program code can leverage Legion's dynamic task repartitioning (e.g., 'task stealing') to adapt to system changes in real time. The planner is tuned to understand when it does and does not make sense to attempt to reconfigure versus using alternate datapaths or different plans.

Flexibility is provided in embodiments of the present invention by one or more of the PCIe management performed on the Optical Network Interface Card (O-NIC) FPGA, the conversion to the optical domain of PCIe data on the O-NIC, and the use of the MEMS Optical Circuit Switch. Each Optical Network Interface Card (O-NIC) will have two pairs of fibers: one fiber for transmitting and one for receiving data. Both pairs connect to the optical circuit switch, allowing the optical circuit to be connected between any two optical ports using software-defined networks. The optical circuit switch can be based on a broadband (commercially available) microelectromechanical system (MEMS) switch, which is spatially broadband, routing from any fiber pair to any other fiber pair connected to the switch. It does so with minimal latency (only time of flight through the switch) and minimal impact on signal quality.

The O-NICs, discussed in various places herein, including but not limited to FIGS. 1-4, are the core of the optical components in certain embodiments of the present invention. In some examples, each O-NIC includes a 16-lane PCIe interface that can connect as a slave device to a server, or serve as a master interface to a GPU or SSD. The O-NIC will perform any address translation that is required and convert the electrical PCIe signals to optical signals on a single fiber pair. An Application Accelerator Firmware Core capability is added to the optical NIC to further increase effective data rate and reduce the effective latency by reducing the amount of data transferring over the electrical part of the PCIe link.

Embodiments of the present invention can include an Optical MEMS Switch and Control Plane. Some embodiments of the present invention utilize a MEMS switch, a commercially available product, which transparently interconnects any pair of input and output ports into an optical lightpath. Once such a transparent path is configured across the MEMS switch in some embodiments of the present invention, the path has minimal impact on the optical signal. This one switch embodiment can be controlled through a standard Ethernet interface and a driver application running on a server (in Legion Realm). In embodiments of the present invention, the planner carefully plans for network configuration and judiciously uses switch reconfiguration during application execution. Embodiments of the present invention utilize multiple connections on the O-NIC cards to allow continued operation on channel A while channel B is being reconfigured. Some embodiments of the present invention therefore include an Ethernet network as a management auxiliary control plane for the MEMS optical switch.

As discussed above, in some embodiments of the present invention, the FPGA is responsible for all interactions between the host (e.g., the device) and the Optical Modules. At the lowest level, the FPGA forwards the PCIe data bits between the various interfaces. However, in the architecture of embodiments of the present invention, the FPGA achieves high network performance while providing additional algorithm dataflow paradigms (including direct storage element to GPU data flows without using any server resources).

Some embodiments of the present invention include a PCIe Root Complex to provide device virtualization. The PCIe Root Complex is the PCIe component attached to and managing PCIe on behalf of the CPU. It is responsible for understanding what devices exist on PCIe, what capabilities they have, and how to reach and address them. It discovers this information through a process called enumeration. Embodiments of the present invention use an Nontransparent bridging (NTB) approach (implemented as address translation) that has the O-NIC Manager claim that one (or two) type of every device (e.g., O-NIC, Server, GPU, NVMe RAID, etc.) is present when the server's Root Complex attempts to enumerate the bus—whether or not they—or any device—is connected to the O-NIC. The O-NIC will pick suitable Base Address Registers (memory address and size) for each device so that everyone will know who to talk to. Then, if Legion should choose to circuit switch a GPU to the O-NIC, the operating system and PCIe controller root complex will be able to use the device without any delay. The system kernel will check the root complex enumeration and attach an operating system driver to each PCIe device that will in turn attempt to configure it. The vast majority of devices it attempts to configure will not actually be there (for example, another system might be trying to configure the same device, or even the same system might be trying to configure the same device just attached to a different O-NIC card/channel. Thus, embodiments of the present invention create shadow configuration registers for the driver to configure when the real device is not available. One alternative is to gather traces from actual configuration attempts and replay them. Another alternative is to route the configuration through the network to an actual (unused) device to satisfy it. Embodiments of the present invention can include a "failure" responder in the firmware so that if, e.g., the kernel attempts to read from the disk to try and automatically mount (i.e., auto-mount) it, it will stop doing so. In embodiments of the present invention, the firmware ensures that the kernel and root complex are happy so that any device could be used when desired, but ensures that no one will actually attempt to use it prior to the Legion planner or similar resource manager assigning the resource to this node.

As noted above, some embodiments of the present invention use Non-Transparent-Bridging and create virtual PCIe entities using Base Address Registers (BARs) that do not necessarily correspond to any real device. When Legion configures the optical circuit switch to attach one or more real devices to the O-NIC, it will also load the actual BAR the PCIe device/switch is using, so that as addresses come in or leave the O-NIC, they will correspond to the correct address space of the receiving host. Thus, the program code in embodiments of the present invention can use address translation to reduce necessary global knowledge of internal server memory state—this both reduces network traffic and increases security. Specifically, when a source is performing environment RDMA into a remote input buffer on the destination server, it normally does not need to know which address it is going into. Instead, if the application allows (it is producing contextless work that does not need to be specifically stored in addresses relative to other address— like image blocks might), it can write to a virtual counter-like address and the Address Translation unit, in cooperation with the Legion Runtime, pick the actual physical memory address to place the memory based on the most recent free list.

Embodiments of the present invention provide enhanced security based on the use of PCIe. In recent years, the system IOMMU has been placed in the PCIe-to-system-memory datapath to conceptually limit what a PCIe device could do. However, this security enhancement is not effective in the highly dynamic multi-connection environment of the present invention. For example, just because a GPU is allowed to transfer data to address 0xf000000, does not mean that a server attached to the same optical NIC should be allowed to do the same thing. The IOMMU cannot tell which of the two sources the request came from, if generated by a malicious entity. Fortunately, the O-NIC Manager Firmware knows where the request came from (and that source cannot be spoofed because the optical topology is known—unlike solutions using packet switched technology). Further, the O-NIC Manager is aware of the Legion configuration for data sharing and memory usage so the address space is restricted to input and output buffers (Regions), at least for Legion applications. The Security Filter firmware in the O-NIC Manager is like a packet filter, but it is one where the rules actively reflect the current system configuration, including through snooping the system buffer allocation messages from consumers to producers. Additionally, the number of IOMMU controls is limited and the speed of IOMMU reconfiguration is slow—all providing added value for implementing security on the O-NIC.

In embodiments of the present invention, the O-NIC can receive messages from the host, either optical interface, or the Application Accelerator Firmware Core. Each message may need to be sent to any or all of those destinations. The O-NIC Manager can maintain a routing table that specifies, based on source (port) and destination (address), where the messages should go. This table will be loaded, in some embodiments of the present invention, from the Legion Realm runtime, since it reflects more of a policy based decision than a topological one (like IP routing tables usually have). This routing table allows the system to implement data flows more sophisticated than simple point-to-point links. Data can be flooded down a tree from a data source. Data could be routed to a destination that was not directly connected. A data-sharing ring could be implemented where each system extracts a copy of the data while forwarding it to the next station in the ring.

Embodiments of the present invention can include error detection and handling. PCIe has two levels of 32-bit checksums, the End to End Cyclic Redundancy Check (ECRC) and the Link CRC (LCRC). In embodiments of the present invention, the program code checks the LCRC on the O-NIC and immediately causes a Negative Acknowledgement (NAK) indicating loss to force a retransmission. Since some embodiments perform cut-through forwarding, the program code has mostly transmitted the packet before the package can be identified as bad. For photonics links, the program code transmits a special illegal trailer so the program code can detect that the error has already been dealt with. For the electrical PCIe interface, the program code will catch and suppress the duplicate NAK generated by the host. The use of the PCIe standard NAK causes the messages to be automatically resent. As a point-to-point low-level protocol, it is able to work well and efficiently assuming good behavior. Only if the PCIe header is corrupted in multiple fields at the same time would this scheme go awry. Fortunately, all of the users of PCIe will eventually detect the failure and retry.

As aforementioned, in embodiments of the present invention, in an FPGA, an Application Accelerator Firmware Core Controller is a mechanism to install and execute the application accelerator firmware in the O-NIC FPGA to increase total cluster processing capabilities and improve effective data rate and latency. Application Accelerator Firmware Cores are provided to Legion as part of the execution package, just like application CPU and GPU code. As Legion (through the planner) assigns resources and (through the Realm modules) deploys code to those resources, so too will it manage and deploy firmware to the FPGA (using the O-NIC Manager to effect the installation). The Application Accelerator Firmware Core Controller performs module-based partial firmware updates to avoid interrupting normal PCIe processing during reconfiguration. The Application Accelerator Firmware Core includes a configuration to define the types of data for which it will be called. It can receive incoming FPGA data in a streaming fashion (for low latency) or as an entire message (for low complexity). It can get a copy of the data, or it can intercept the data. It can modify the data in transit, block it, forward it, duplicate it, or decide to generate PCIe messages due to any event (including timer events). The Application Accelerator Firmware Core has metadata accompanying it (actually stored in the routing table) specifying the types of messages it may receive or send. This metadata takes effect both after (for received data) and before (for transmitted data) security processing so that Application code cannot bypass security protections in embodiments of the present invention, through the use of firmware. In some embodiments of the present invention, firmware itself only has access to the wires (internal state) of the defined accelerator API.

In various embodiments of the present invention, since the user-provided application firmware is so close to the optical transceiver, it provides extremely low-latency (e.g., about 9 ns plus speed of light delays) communications between application modules on different servers. The Application Accelerator Firmware Core can perform this low-latency processing while leaving the server's CPUs (or potentially even the PCIe lanes assigned to the O-NIC card, depending on application needs) free to work on other tasks. Their pure computing power will also boost the computation power of the entire network.

PCIe peer-to-peer PCIe device transfers, including one called "GPU Direct" are more efficient than "normal" transfers that are be performed under the auspicious of the host CPU. However, on traditional computers they still involve a transfer from the PCIe device to the host's PCIe Root Complex logic, using (e.g.) 16 PCIe lanes. Then the PCIe Root Complex sends the data it receives directly out to a second device using another 16 PCIe lanes, without ever hitting the host CPU or memory. Efficient to CPU and memory resources, but 32 lanes of the server's PCIe bandwidth (in addition to the requesting client's 16 lanes) and corresponding PCIe Root Complex resources were used in this process. In contrast, in embodiments of the present invention, true peer-to-peer PCIe device connectivity is enabled. One of the optical ports on the two devices can be circuit switched to each other, then there is a 16-lane PCIe channel between the two devices that does not involve any third party. This capability achieves direct peer-to-peer connectivity in some situations, but when considering two PCIe devices circuit switched together, such as NVMe storage elements, the storage devices are passive elements and could not be instructed to, for example, duplicate data from one disk to another. More complex devices such as GPUs could have a program uploaded instructing it to access another device, but even a multiport O-NIC could not perform streaming processing (simultaneously reading from the storage element at full bandwidth while writing the processed data to the next processing stage at full bandwidth) due to the PCIe read requests having to be transmitted to receive data.

Included in embodiments of the present invention is an Application Accelerator Firmware Core whose purpose is to manage transfers. Specifically, it will issue read requests to a storage element on port A and get the storage blocks back. It will forward those blocks, using PACE and Legion for its knowledge of the application needs, to the GPU RAM for processing. Similarly, it will use PACE to receive output blocks that have finished processing GPU and forward them over the second optical port to the next step in the forwarding chain. The storage read requests will never touch the GPU's PCIe channel, they will be managed by the FPGA, increasing effective bandwidth. A simple file system implementation is utilized as an example in this module to provide useful and file-ordered data blocks to the application. Some embodiments of the present invention support co-processing with user-provided Application Accelerator Firmware Core in case the data must be further massaged (e.g., decompressed) before being provided to the GPU.

In embodiments of the present invention, the PCIe Interface Firmware is responsible for understanding how to use the PCIe interface, including performing data serialization and deserialization, checksums, and PCIe Root Complex enumeration. To operate effectively within the technical environment of embodiments of the present invention standard firmware can be customized by stripping functionality that is implemented by the O-NIC Manager (e.g., PCIe Root Complex enumeration and board management) or not relevant to a particular interface (any management requests coming from the Optical Module). One modification, in particular, to the PCIe firmware will decrease network latency. Using a technique successfully applied in existing FPGA firmware, a streaming "cut-through" datapath is implemented that allows the program code in embodiments of the present invention to start transmitting PCIe data to the intended recipient before the program code has fully received the PCIe "packet," specifically, once the program code has received the full PCIe TLP header. There may be some additional latency since PCIe lanes are not tightly mutually synchronized—up to 6 ns skew (up to 48 bits of data worth) for PCIe 3.0. However, once all of the lanes have received enough data so that the TLP header can be reassembled by the program code, the program code performs any O-NIC Manager processing and decides the output port or ports (if any—the packet might be destined for the FPGA itself). All data from then on are directly streamed to the output port (or Application Accelerator Firmware Core).

This cut-through technique removes the latency disadvantages of traditional PCIe bridges and switches and is critical to minimizing latency. This technique will generally restrict the latency of the FPGA processing to the 3 to 9 ns range (depending on incoming skew). Without this technique, the FPGA latency would be over 500 ns.

Described herein are various systems, computer-implemented methods, and computer program products. In some examples, a system disclosed herein includes two or more devices, where each device comprises at least one processing circuit, where each computing device comprises or is communicatively coupled to one or more optical network interface controller (O-NIC) cards, where each O-NIC card comprises at least two bidirectional optical channels, where each of the two or more devices is configured to transmit data to each device communicatively coupled to an O-NIC card and to receive additional data from each O-NIC card communicatively coupled to a device of the two or more devices, over a connection comprising at least one channel of the at least two bidirectional optical channels. The system also includes one or more interfaces, where at least one interface of the one or more interfaces is communicatively coupled to the at least one processing circuit of each device. The system also includes a memory and one or more processors in communication with the memory, where the one or more processors are communicatively coupled to at least one device of the two or more devices or to a device comprising the at least one interface of the one or more interfaces. The system also includes program instructions executable by the one or more processors via the memory to perform a method, the method includes: modifying, by the one of more processors, during runtime of at least one application, a pairing over a given bidirectional optical channel of an interface of the one or more interfaces to a given device of the two or more devices.

In some examples at least a portion of the one or more interfaces comprise Peripheral Component Interconnect Express (PCIe) network device resources.

In some examples, each of the two or more devices is selected from the group consisting of: graphical processing units, disk drives, radar receivers, central process units, field-programmable gate arrays (FPGAs), and computers.

In some examples, certain devices of the two or more devices comprise general purpose computing systems, and the at least two bidirectional optical channels are configured to forward certain data between the at least two bidirectional optical channels without interaction with any of the certain devices.

In some examples, each of the two or more devices is configured to simultaneously transmit the data to each device with the O-NIC card and to receive the additional data from each O-NIC card communicatively coupled to the at least one device.

In some examples, the method further comprising: oversubscribing total transfer bandwidth through on-O-NIC buffering of at least one O-NIC card of the plurality of O-NIC cards.

In some examples, the method further comprises: directing, by the one or more processors, at least one individual transfer over a channel of the at least two bidirectional optical channels, to one or more distinct destinations.

In some examples, the directing comprises allowing an activity selected from the group consisting of: broadcast, multicast, and flooding topologies.

In some examples, the at least one O-NIC card of the plurality of O-NIC cards comprises an additional device selected from the group consisting of: a CPU, an FPGA, an application-specific integrated circuit (ASIC), and very large scale integration (VLSI) circuit.

In some examples, the at least one O-NIC card is configured to perform an activity selected from the group consisting of: intelligently forward network traffic, intelligently direct network traffic, buffer network traffic, manipulate network traffic, secure network traffic, and filter network traffic.

In some examples, the two or more devices are configured to simultaneously transmit the data to each interface of the one or more interfaces and to receive the additional data from each interface of the one or more interfaces at full bandwidth.

In some examples, each channel on each card is configured to be independently directed.

In some examples, the method described herein may include: configuring, by one or more processors, a topology of a computing network; generating, by the one or more processors, an execution plan for an application executed by one or more computing resources of the given computing network, where the execution plan comprises executing separable execution blocks of the application on one or more processing elements of the computing network, and where the generating comprises specifying the configured topology at an initial phase of the execution plan; effecting, by the one or more processors, execution of the application, based on the execution plan; executing, by the one or more processors, the application, in accordance with the execution plan; and monitoring, by the one or more processors, the executing application.

In some examples, effecting execution of the application comprises: activating the configured topology to enable threads of the application to run on different processing elements of the processing elements and transparently access memory of the different processing elements.

In some examples, monitoring the execution plan comprises an activity selected from the group consisting of: monitoring runtime execution to handle irregularities, where the irregularities comprise stalled processing pipelines, and re-configuring the topology during the runtime.

In some examples, generating the execution plan for the application comprises: analyzing, by the one or more processors, inherent parallelism in the application to identify the separable execution blocks and data flow paths between the separable execution blocks; and identifying, by the one or more processors, a most efficient placement of the separable execution blocks on the processing elements and a location a size of each memory resource to be utilized in the executing.

In some examples, effecting the execution of the application, based on the execution plan, comprises: based on the identifying, distributing, by the one or more processors, the separable execution blocks into units to be executed on the processing elements; and moving, by the one or more processors, data in the data flow paths between the separable execution blocks, between resources of the computing network, based on the execution plan.

In some examples, generating the execution plan further comprises reconfiguring the topology one or more times after the initial phase of the execution plan.

In some examples, the computing network comprises: two or more devices, where each device comprises or is communicatively coupled to one processing elements of the processing elements, where each computing device comprises or is communicatively coupled to one or more optical network interface controller (O-NIC) cards, where each O-NIC card comprises at least two bidirectional optical channels, where each of the two or more devices is configured to transmit data to each device communicatively coupled to an O-NIC card and to receive additional data from each O-NIC card communicatively coupled to a device of the two or more devices, over a connection comprising at least one channel of the at least two bidirectional optical channels; and one or more interfaces, where at least one interface of the one or more interfaces is communicatively coupled to the at least one processing element of the one or more processing elements.

In some examples, at least a portion of the one or more interfaces comprise Peripheral Component Interconnect Express (PCIe) network device resources.

Figure 9:
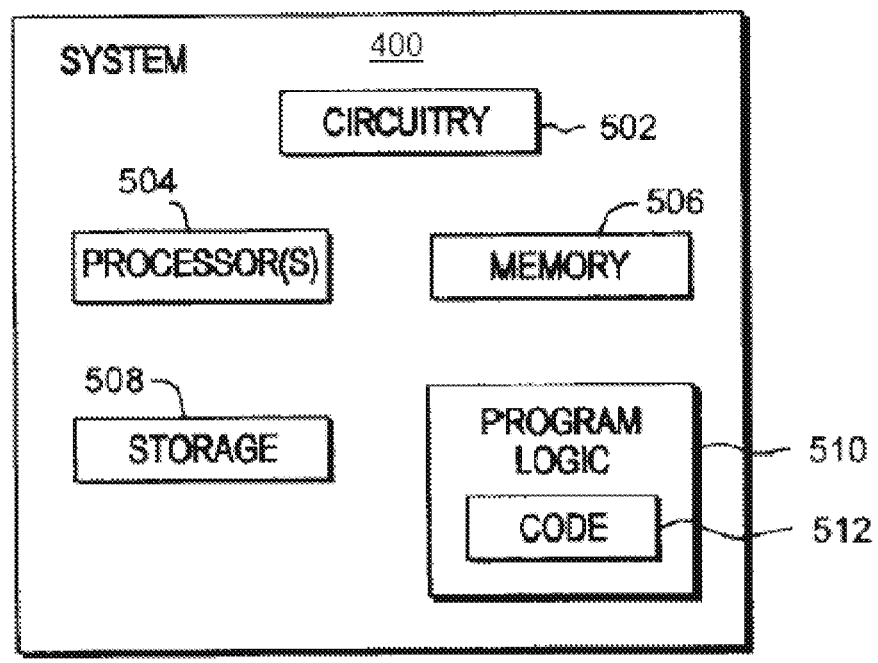
FIG. 9 illustrates a block diagram of a resource 400 in computer system, such as, which is part of the technical architecture of certain embodiments of the technique.

FIG. 9 illustrates a block diagram of a resource 400 in computer system, such as, which is part of the technical architecture of certain embodiments of the technique. In FIG. 9, the resource 400 may include a circuitry 502 that may in certain embodiments include a microprocessor 504. The computer system 400 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 400 may include a program logic 510 including code 512 that may be loaded into the memory 506 and executed by the microprocessor 504 or circuitry 502.

In certain embodiments, the program logic 510 including code 512 may be stored in the storage 508, or memory 506. In certain other embodiments, the program logic 510 may be implemented in the circuitry 502. Therefore, while FIG. 9 shows the program logic 510 separately from the other elements, the program logic 510 may be implemented in the memory 506 and/or the circuitry 502. The program logic 510 may include the program code discussed in this disclosure that facilitates the reconfiguration of elements of various computer networks, including those in various figures.

Figure 10:
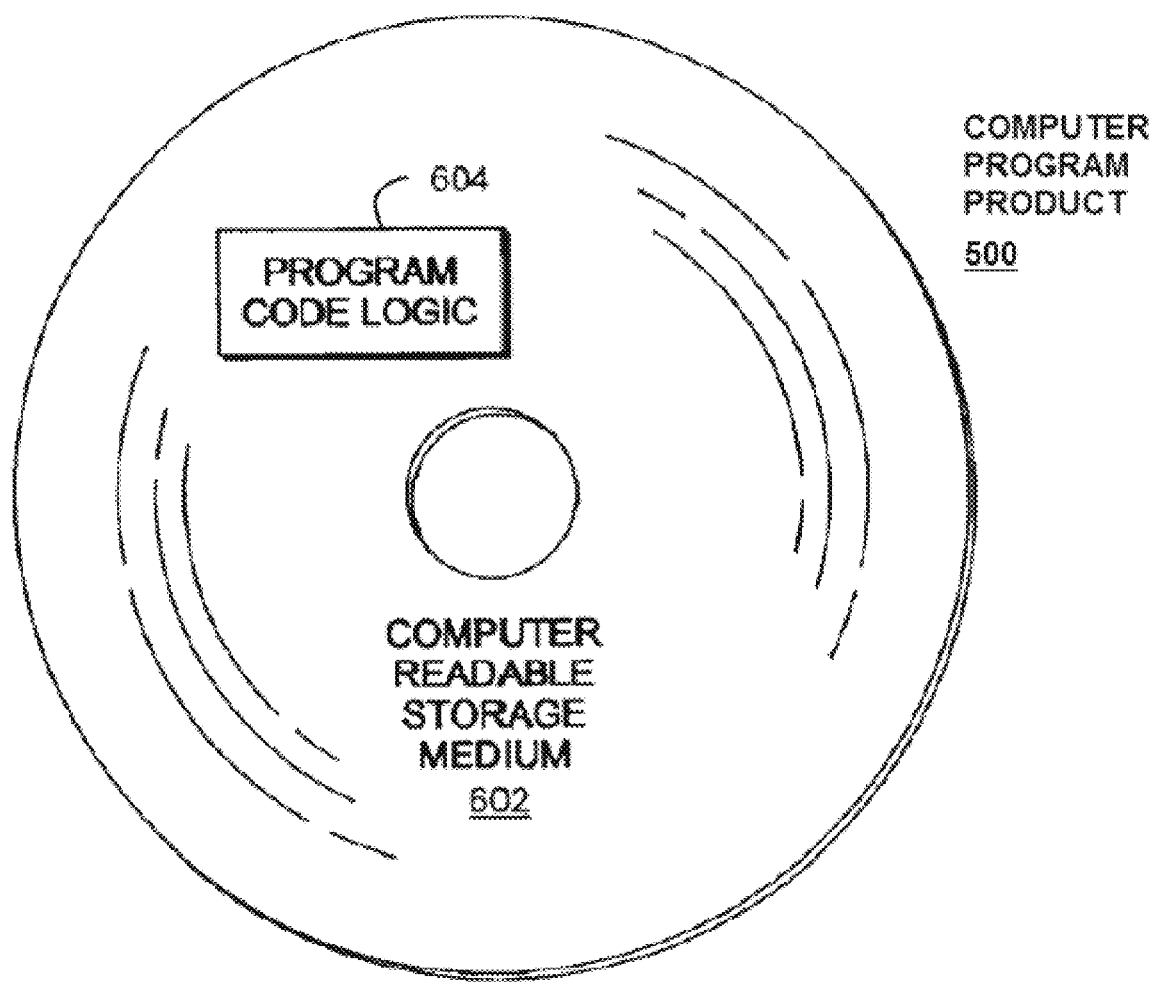
FIG. 10 is a computer program product that can be utilized in certain embodiments of the present invention.

Using the processing resources of a resource 400 to execute software, computer-readable code or instructions, does not limit where this code can be stored. Referring to FIG. 10, in one example, a computer program product 500 includes, for instance, one or more non-transitory computer readable storage media 602 to store computer readable program code means or logic 604 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing (e.g., Matlab). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software and/or program code, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples.

Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated

The invention claimed is:

1. A computer system comprising:
    two or more devices, wherein each device of the two or more devices comprises at least one processing circuit, wherein each device of the two or more devices comprises or is communicatively coupled to one or more optical network interface controller (O-NIC) cards, wherein each O-NIC card comprises at least two bidirectional optical channels, wherein each device of the two or more devices is configured to transmit data to each device of the two or more devices communicatively coupled to an O-NIC card and to receive additional data from each O-NIC card communicatively coupled to a device of the two or more devices, over a connection comprising at least one channel of the at least two bidirectional optical channels of a given O-NIC card of the one or more O-NIC cards, wherein each channel of each O-NIC card is configured to connect directly to an endpoint, wherein based on utilizing the one or more O-NIC cards, each device of the two or more devices transmits data and receives additional data simultaneously via the at least two bidirectional optical channels, wherein each NIC card of the one or more O-NIC cards is paired to at least two endpoints comprising resources of the computer system, wherein each connection for each device over the at least two bidirectional optical channels is a full bandwidth connection;
    one or more interfaces, wherein at least one interface of the one or more interfaces is communicatively coupled to the at least one processing circuit of each device;
    a memory;
    one or more processors in communication with the memory, wherein the one or more processors are communicatively coupled to at least one device of the two or more devices or to a device comprising the at least one interface of the one or more interfaces;

program instructions executable by the one or more processors via the memory to perform a method, the method comprising:

modifying, by the one of more processors, during runtime of at least one application, a pairing over a given bidirectional optical channel of an interface of the one or more interfaces to a given device of the two or more devices to match a parallelization structure of the application to underlying hardware of the computer system, wherein the modifying dynamically changes an existing pairing of at least one O-NIC card from an existing endpoint to a new endpoint, wherein a new connection between the at least one O-NIC card and the new endpoint comprises a full bandwidth connection, wherein the modifying comprises restricting access to specific memory ranges to prevent access to another application or an operating system of the computing system over the new connection.

2. The system of claim 1, wherein at least a portion of the one or more interfaces comprise Peripheral Component Interconnect Express (PCIe) network device resources.

3. The system of claim 1, where each of the two or more devices is selected from the group consisting of: graphical processing units, disk drives, radar receivers, central process units, field-programmable gate arrays (FPGAs), and computers.

4. The computer system of claim 1, wherein certain devices of the two or more devices comprise general purpose computing systems, and wherein the at least two bidirectional optical channels are configured to forward certain data between the at least two bidirectional optical channels without interaction with any of the certain devices.

5. The computer system of claim 1, the method further comprising:
oversubscribing total transfer bandwidth through on-O-NIC buffering of at least one O-NIC card of the plurality of O-NIC cards.

6. The computer system of claim 1, the method further comprising:
directing, by the one or more processors, at least one individual transfer over a channel of the at least two bidirectional optical channels, to one or more distinct destinations.

7. The computer system of claim 6, wherein the directing comprises allowing an activity selected from the group consisting of: broadcast, multicast, and flooding topologies.

8. The computer system of claim 1, wherein the at least one O-NIC card of the plurality of O-NIC cards comprises an additional device selected from the group consisting of: a CPU, an FPGA, an application-specific integrated circuit (ASIC), and very large scale integration (VLSI) circuit.

9. The computer system of claim 8, wherein the at least one O-NIC card is configured to perform an activity selected from the group consisting of: intelligently forward network traffic, intelligently direct network traffic, buffer network traffic, manipulate network traffic, secure network traffic, and filter network traffic.

10. The computer system of claim 1, wherein each channel of the at least two bidirectional optical channels of each O-NIC card of the one or more O-NIC card is configured to be independently directed.

11. A computer-implemented method, comprising:
configuring, by one or more processors, a topology of a computing network;
generating, by the one or more processors, an execution plan for an application executed by one or more computing resources of the given computing network, wherein the execution plan comprises executing separable execution blocks of the application on one or more processing elements of the computing network, and wherein the generating comprises specifying the configured topology at an initial phase of the execution plan;
effecting, by the one or more processors, execution of the application, based on the execution plan;
executing, by the one or more processors, the application, in accordance with the execution plan;
monitoring, by the one or more processors, the executing application, wherein the monitoring comprises performing machine-learning and automatically providing feedback for future iterations of generating the execution plan;
updating, by the one or more processors, the execution plan for the application based on the feedback; and
effecting, by the one or more processors, execution of the application, based on the updated execution plan.

12. The computer-implemented method of claim 11, wherein effecting execution of the application comprises:
activating the configured topology to enable threads of the application to run on different processing elements of the processing elements and transparently access memory of the different processing elements.

13. The computer-implemented method of claim 11, wherein monitoring the execution plan comprises an activity selected from the group consisting of: monitoring runtime execution to handle irregularities, wherein the irregularities comprise stalled processing pipelines, and re-configuring the topology during the runtime.

14. The computer-implemented method of claim 11, wherein generating the execution plan for the application comprises:
analyzing, by the one or more processors, inherent parallelism in the application to identify the separable execution blocks and data flow paths between the separable execution blocks; and
identifying, by the one or more processors, a most efficient placement of the separable execution blocks on the processing elements and a location a size of each memory resource to be utilized in the executing.

15. The computer-implemented method of claim 14, wherein effecting the execution of the application, based on the execution plan, comprises:
based on the identifying, distributing, by the one or more processors, the separable execution blocks into units to be executed on the processing elements; and
moving, by the one or more processors, data in the data flow paths between the separable execution blocks, between resources of the computing network, based on the execution plan.

16. The computer-implemented method of claim 11, wherein generating the execution plan further comprises reconfiguring the topology one or more times after the initial phase of the execution plan.

17. The computer-implemented method of claim 11, wherein the computing network comprises:
two or more devices, wherein each device of the two or more comprises or is communicatively coupled to one processing elements of the processing elements, wherein each device of the two or more devices comprises or is communicatively coupled to one or more optical network interface controller (O-NIC) cards, wherein each O-NIC card comprises at least two bidirectional optical channels, wherein each device of the two or more devices is configured to transmit data to each device of the two or more devices communicatively coupled to an O-NIC card and to receive additional data from each O-NIC card communicatively coupled to a device of the two or more devices, over a connection comprising at least one channel of the at least two bidirectional optical channels of a given O-NIC card of the one or more O-NIC cards, wherein each channel of each O-NIC card is configured to connect directly to an endpoint, wherein based on utilizing the one or more O-NIC cards, each device of the two or more devices transmits data and receives additional data simultaneously via the at least two bidirectional optical channels, wherein each NIC card of the one or more O-NIC cards is paired to at least two endpoints comprising resources of the computer system, wherein each connection for each device over the at least two bidirectional optical channels is a full bandwidth connection; and one or more interfaces, wherein at least one interface of the one or more interfaces is communicatively coupled to the at least one processing element of the one or more processing elements.

18. The computer-implemented method of claim 17, wherein at least a portion of the one or more interfaces comprise Peripheral Component Interconnect Express (PCIe) network device resources.

19. The computer-implemented method of claim 11, wherein the separable execution blocks of the application comprise tasks, wherein a first portion of the tasks comprise source tasks and a second portion of the tasks comprise destination tasks, and wherein each source task includes one or more data transfers to at least one destination task, wherein the computing network comprises compute nodes, and wherein generating the execution plan for the application further comprises:

balancing, by the one or more processors, a workload of the application, wherein the balancing comprises minimizing communication cost of the tasks, the balancing comprising:
mapping, by the one or more processors, a vertex of each task of the tasks to a compute node, wherein the mapping comprises mapping the source tasks and the destination tasks to compute nodes; and
routing, by the one or more processors, for each source task, the one or more data transfers along a shortest route in the topology from a compute node of the compute nodes executing a given source task of the source tasks, to a compute node mapped to a destination task of the given source task.

* * * * *